US012719654B2

(12) United States Patent
Abdelghaffar et al.

(10) Patent No.: US 12,719,654 B2
(45) Date of Patent: Aug. 25, 2026

(54) TECHNIQUES FOR MITIGATING CROSS-LINK INTERFERENCE FOR DOWNLINK COMMUNICATIONS

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Qian Zhang, Basking Ridge, NJ (US); Yan Zhou, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 350 days.

(21) Appl. No.: 18/300,118

(22) Filed: Apr. 13, 2023

(65) Prior Publication Data

US 2024/0348415 A1 Oct. 17, 2024

(51) Int. Cl.
*H04W 24/10* (2009.01)
*H04B 17/336* (2015.01)
(Continued)

(52) U.S. Cl.
CPC ......... *H04L 5/1469* (2013.01); *H04B 17/336* (2015.01); *H04L 27/2605* (2013.01); *H04W 24/10* (2013.01)

(58) Field of Classification Search
CPC ..... H04L 1/1642; H04L 47/34; H04L 1/1607; H04W 28/06; H04W 28/082;
(Continued)

(56) References Cited

U.S. PATENT DOCUMENTS 11,245,481 B2 2/2022 Kang et al.
11,271,699 B1 * 3/2022 Eyuboglu ............ H04L 1/1819
(Continued)

FOREIGN PATENT DOCUMENTS

WO 2020190098 A1 9/2020
WO WO-2021228211 A1 11/2021
(Continued)

OTHER PUBLICATIONS

International Search Report and Written Opinion—PCT/US2024/020379—ISA/EPO—Jun. 18, 2024.

*Primary Examiner* — Nathan S Taylor
(74) *Attorney, Agent, or Firm* — Harrity & Harrity/Qualcomm Incorporated

(57) ABSTRACT

Various aspects of the present disclosure generally relate to wireless communication. In some aspects, a user equipment (UE) may receive, from a network node, an indication of one or more full-duplex time intervals. The UE may receive, from the network node, an indication of a timing of a downlink communication, the downlink communication including at least one of a reference signal for measurement or a control channel communication. The UE may perform an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval. Numerous other aspects are described.

30 Claims, 12 Drawing Sheets

(51) Int. Cl.
*H04L 5/14* (2006.01)
*H04L 27/26* (2006.01)

(58) Field of Classification Search
CPC . H04W 28/0865; H04W 28/09; H04W 76/15; H04W 88/06; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20
See application file for complete search history.

(56) References Cited

U.S. PATENT DOCUMENTS 11,375,527 B1 * 6/2022 Eyuboglu .......... H04B 7/15528
11,425,734 B2 8/2022 Yasukawa et al.
11,838,151 B1 * 12/2023 Jones .................. H04L 25/0224
2021/0273774 A1 * 9/2021 Abotabl ............ H04W 72/0446
2022/0022206 A1 1/2022 Ibrahim et al.
2022/0110146 A1 * 4/2022 Xu ............................ H04L 5/14
2022/0159580 A1 * 5/2022 Su ............................. H04L 5/14
2023/0042073 A1 * 2/2023 Ibrahim ................ H04W 52/24
2023/0090986 A1 * 3/2023 Jang ..................... H04B 17/204 370/329
2023/0113873 A1 * 4/2023 Ibrahim ............... H04B 17/336 370/329
2023/0155798 A1 * 5/2023 Abotabl ................ H04L 5/0092 370/329
2023/0164674 A1 * 5/2023 Zhou ................... H04W 36/362 370/252
2023/0198667 A1 * 6/2023 Abotabl ................ H04L 1/0073 714/726
2023/0224880 A1 * 7/2023 Xiong ............... H04W 72/0446 370/329
2023/0276389 A1 * 8/2023 Ko ........................ H04W 72/04 370/350
2023/0319728 A1 * 10/2023 Zhou ..................... H04L 5/1461 370/277
2023/0379956 A1 * 11/2023 Zhang ................... H04L 5/0035
2023/0422283 A1 * 12/2023 Ibrahim ................ H04L 5/1469
2024/0048349 A1 * 2/2024 Abdelghaffar ........ H04L 5/0064
2024/0064649 A1 * 2/2024 Go ...................... H04W 52/262
2024/0147279 A1 * 5/2024 Zhang ................... H04W 24/10
2024/0163854 A1 * 5/2024 Liu ................... H04W 72/0446
2024/0322880 A1 * 9/2024 Noh ......................... H04B 7/06
2024/0334220 A1 * 10/2024 Zhang ....................... H04L 5/14
2024/0372595 A1 * 11/2024 Mungara .............. H04B 7/0632
2024/0373421 A1 * 11/2024 Jang ...................... H04L 5/0012
2025/0105993 A1 * 3/2025 Li ..................... H04W 72/1263
2025/0105995 A1 * 3/2025 Ke ........................ H04L 5/1461
2025/0266915 A1 * 8/2025 Khan Beigi .......... H04L 1/0026
2025/0266979 A1 * 8/2025 Seok ..................... H04L 5/0048

FOREIGN PATENT DOCUMENTS

WO WO-2022190069 A1 9/2022
WO WO-2022222021 A1 * 10/2022 ........... H04B 17/336
WO WO-2024064435 A1 * 3/2024 ............ H04W 24/08
WO WO-2024068136 A1 * 4/2024 ........... H04L 5/0094

* cited by examiner

500

TECHNIQUES FOR MITIGATING CROSS-LINK INTERFERENCE FOR DOWNLINK COMMUNICATIONS

FIELD OF THE DISCLOSURE

Aspects of the present disclosure generally relate to wireless communication and to techniques and apparatuses for mitigating cross-link interference (CLI) for downlink communications.

DESCRIPTION OF RELATED ART

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving, from a network node, an indication of one or more full-duplex time intervals. The method may include receiving, from the network node, an indication of a timing of a downlink communication, the downlink communication including at least one of a reference signal for measurement or a control channel communication. The method may include performing an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval.

Some aspects described herein relate to a method of wireless communication performed by a network node. The method may include transmitting an indication of one or more full-duplex time intervals. The method may include transmitting an indication, for a first UE and a second UE, of a timing of a downlink communication intended for the first UE, the downlink communication including at least one of a reference signal for measurement or a control channel communication. The method may include transmitting the downlink communication, for the first UE, based at least in part on the timing of the downlink communication indicating that the downlink communication is to occur during a full-duplex time interval of the one or more full-duplex time intervals or a non-full-duplex time interval.

Some aspects described herein relate to a UE for wireless communication. The UE may include a memory and one or more processors coupled to the memory. The one or more processors may be configured to receive, from a network node, an indication of one or more full-duplex time intervals. The one or more processors may be configured to receive, from the network node, an indication of a timing of a downlink communication, the downlink communication including at least one of a reference signal for measurement or a control channel communication. The one or more processors may be configured to perform an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval.

Some aspects described herein relate to a network node for wireless communication. The network node may include a memory and one or more processors coupled to the memory. The one or more processors may be configured to transmit an indication of one or more full-duplex time intervals. The one or more processors may be configured to transmit an indication, for a first UE and a second UE, of a timing of a downlink communication intended for the first UE, the downlink communication including at least one of a reference signal for measurement or a control channel communication. The one or more processors may be configured to transmit the downlink communication, for the first UE, based at least in part on the timing of the downlink communication indicating that the downlink communication is to occur during a full-duplex time interval of the one or more full-duplex time intervals or a non-full-duplex time interval.

Some aspects described herein relate to a non-transitory computer-readable medium that stores a set of instructions for wireless communication by a UE. The set of instructions, when executed by one or more processors of the UE, may cause the UE to receive, from a network node, an indication of one or more full-duplex time intervals. The set of instructions, when executed by one or more processors of the UE, may cause the UE to receive, from the network node, an indication of a timing of a downlink communication, the downlink communication including at least one of a reference signal for measurement or a control channel communication. The set of instructions, when executed by one or more processors of the UE, may cause the UE to perform an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval.

Some aspects described herein relate to a non-transitory computer-readable medium that stores a set of instructions for wireless communication by a network node. The set of instructions, when executed by one or more processors of the network node, may cause the network node to transmit an indication of one or more full-duplex time intervals. The set of instructions, when executed by one or more processors of the network node, may cause the network node to transmit an indication, for a first UE and a second UE, of a timing of a downlink communication intended for the first UE, the downlink communication including at least one of a reference signal for measurement or a control channel communication. The set of instructions, when executed by one or more processors of the network node, may cause the network node to transmit the downlink communication, for the first UE, based at least in part on the timing of the downlink communication indicating that the downlink communication is to occur during a full-duplex time interval of the one or more full-duplex time intervals or a non-full-duplex time interval.

Some aspects described herein relate to an apparatus for wireless communication. The apparatus may include means for receiving, from a network node, an indication of one or more full-duplex time intervals. The apparatus may include means for receiving, from the network node, an indication of a timing of a downlink communication, the downlink communication including at least one of a reference signal for measurement or a control channel communication. The apparatus may include means for performing an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval.

Some aspects described herein relate to an apparatus for wireless communication. The apparatus may include means for transmitting an indication of one or more full-duplex time intervals. The apparatus may include means for transmitting an indication, for a first UE and a second UE, of a timing of a downlink communication intended for the first UE, the downlink communication including at least one of a reference signal for measurement or a control channel communication. The apparatus may include means for transmitting the downlink communication, for the first UE, based at least in part on the timing of the downlink communication indicating that the downlink communication is to occur during a full-duplex time interval of the one or more full-duplex time intervals or a non-full-duplex time interval.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
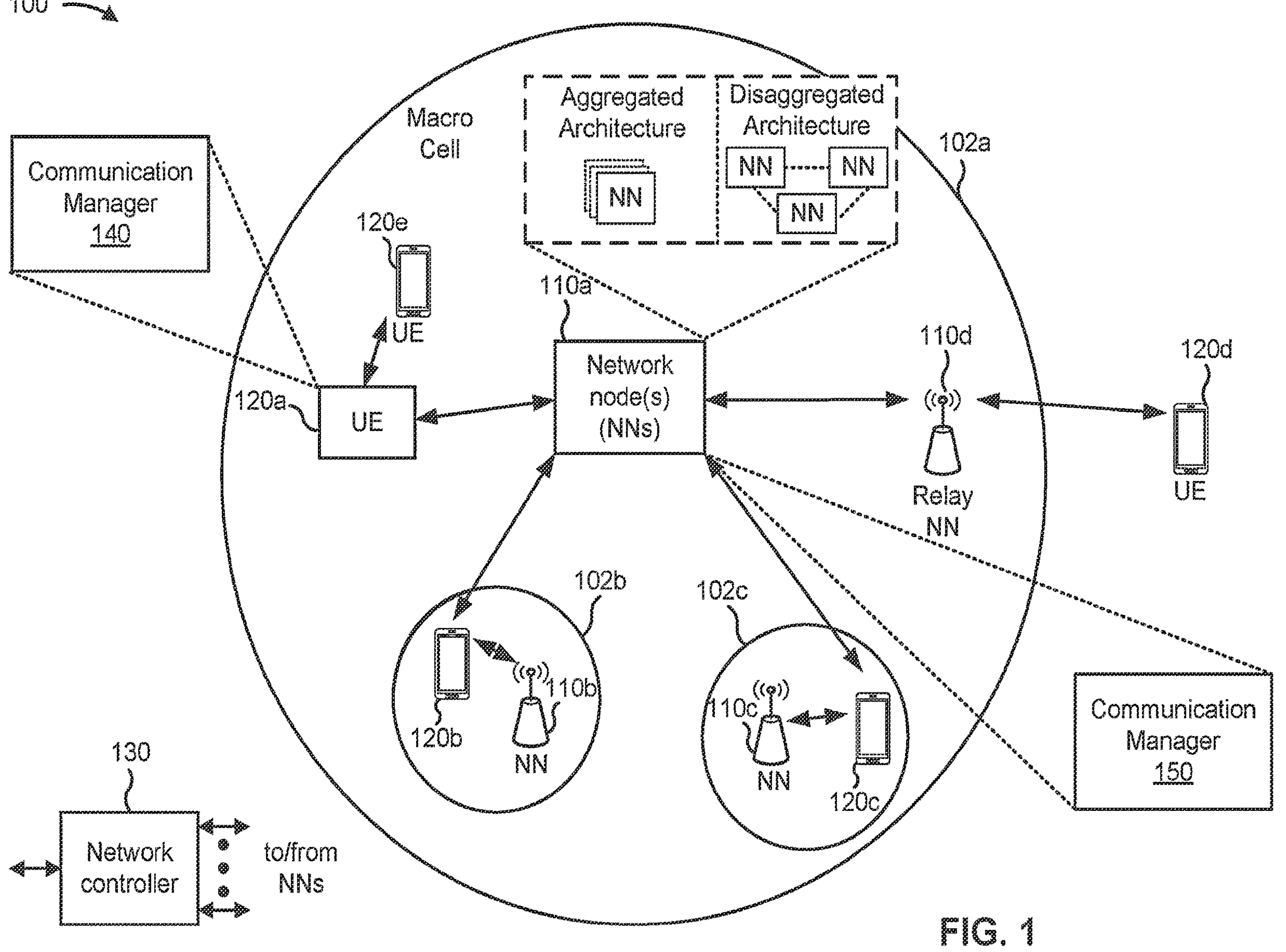
FIG. 1 is a diagram illustrating an example of a wireless network.

Cross-link interference (CLI) may be introduced when a reception of a communication at a first wireless communication device experiences interference caused by a transmission from a second wireless communication device (e.g., that is not intended for the first wireless communication device). For example, a first user equipment (UE) may transmit an uplink communication to a network node. The uplink communication may cause interference with a downlink communication intended for a second UE. This may be referred to as inter-UE CLI. Inter-UE CLI may negatively impact operations at a UE associated with a reception or measurement of a downlink communication. For example, the UE may perform a measurement of a downlink reference signal in a downlink subband of a full-duplex time interval (e.g., a subband full-duplex (SBFD) slot). The measurement of the downlink reference signal may be negatively impacted by CLI introduced by uplink transmissions (e.g., from other UEs) in an uplink subband of the full-duplex time interval. For example, an accuracy of the measurement and/or a reception performance of a downlink communication may be negatively impacted by CLI.

In some cases, one or more uplink transmissions that cause the CLI may cause saturation of one or more radio frequency (RF) components of the UE. "Saturation" of an RF component refers to a state where the RF component is no longer able to accurately amplify or process an incoming signal due to a limitation in one or more physical capabilities of the RF component. In an RF component, such as an amplifier (e.g., a low-noise amplifier (LNA)), a mixer, an RF filter, an analog-to-digital converter (ADC), or another RF component, the ability to amplify or process a signal is determined by a dynamic range of the RF component. The dynamic range is the range of signal amplitudes that the component can accurately process, without introducing distortion or non-linear effects. When the input signal to an RF component exceeds the upper limit of the dynamic range, the RF component becomes saturated. In this state, the RF component is no longer able to accurately amplify or process the signal, and the output signal will be distorted. This distortion can take the form of clipping or flattening of the waveform, because the RF component is unable to accurately reproduce the peaks and valleys of the signal. The one or more uplink transmissions that cause the CLI may result in a saturation of an RF component of the UE, resulting in the UE being unable to receive or process a downlink communication. Further, the one or more uplink transmissions that cause the CLI may cause damage to the RF component(s) of the UE. In other words, the one or more uplink transmissions may cause jamming at the UE, resulting in the UE being unable to receive or process downlink communications and/or causing damage to RF components of the UE.

As another example, the one or more uplink transmissions (e.g., associated with causing inter-UE CLI) may cause a loss of a dynamic range of an RF component of the UE (e.g., of an ADC of the UE). For example, if a power of the one or more uplink transmissions is greater than a power of a downlink communication received by the UE, then the UE may set a dynamic range of the RF component higher (e.g., to avoid or mitigate a risk of saturation of the RF component). As a result, the downlink communication may be received by the UE at least partially outside of the dynamic range of the RF component, resulting in degraded processing and/or performance of the downlink communication. Additionally, or alternatively, the one or more uplink transmissions may result in leakage (e.g., the one or more uplink transmissions may "leak" into frequency resources associated with the downlink communication). The leakage may result in increased interference in a downlink subband. The increased interference may reduce a signal-to-interference-plus-noise ratio (SINR) measurement of a downlink communication that is measured by the UE. As a result, CLI caused by the one or more uplink transmissions may negatively impact performance and/or reliability of a downlink communication received during a full-duplex time interval and/or an accuracy of a measurement performed during a full-duplex time interval.

Some aspects described herein enable mitigating CLI for downlink communications (e.g., in the presence of inter-UE CLI). For example, a UE may receive an indication of a timing of a downlink communication (e.g., a reference signal for measurement and/or a control channel communication). The timing may refer to the time domain resources (e.g. one or more symbols) for the downlink communication. In some aspects, one or more rules or constraints may be defined for indicating allowable time intervals during which certain measurement types (e.g., cell-based measurements) and/or certain PDCCH monitoring may occur. For example, the UE may receive the downlink communication and/or measure the downlink communication based on, in response to, or otherwise associated with the timing of the downlink communication indicating that the downlink communication is to occur during a time interval that is not associated with full-duplex operations (e.g., a non-full-duplex time interval). In other words, when the UE is scheduled or configured to perform certain measurements and/or configured or scheduled to perform physical downlink control channel (PDCCH) monitoring for a common search space (CSS), then the UE may expect that the time interval associated with the measurements and/or the PDCCH monitoring is not configured or indicated as being associated with full-duplex operations (e.g., may expect that the interval associated with the measurements and/or the PDCCH monitoring is a non-full-duplex time interval).

As a result, CLI associated with the downlink communication may be mitigated. For example, because the UE receives an indication of time intervals in which a network node is to perform full-duplex operations (e.g., the UE may receive an indication of one or more full-duplex time intervals), the UE is enabled to identify time intervals during which the certain measurements and/or PDCCH monitoring should occur to avoid or mitigate CLI caused by transmissions from other UEs (e.g., that may occur during full-duplex time intervals). This improves an accuracy of measurements performed by the UE using the downlink communication and/or improves a communication performance of the downlink communication. For example, a likelihood that an RF component of the UE becomes saturated and/or that a dynamic range of an RF component of the UE is set incorrectly may be reduced, thereby improving the performance of the UE when receiving and/or measuring the downlink communication.

In some aspects, the UE may drop (or refrain from receiving or measuring) the downlink communication based on, in response to, or otherwise associated with the timing of the downlink communication indicating that the downlink communication is to occur during a full-duplex time interval. In some aspects, the UE may receive and/or measure the downlink communication during a full-duplex time interval based on, in response to, or otherwise associated with the network node refraining from performing full-duplex operations during the full-duplex time interval. In other words, if the timing of the downlink communication indicates that the downlink communication is to occur during a full-duplex time interval, then the network node may refrain from performing full-duplex operations during the full-duplex time interval. The UE may assume that the network node does not perform full-duplex operations during the full-duplex time interval (e.g., based on, in response to, or otherwise associated with the timing of the downlink communication indicating that the downlink communication is to occur during a full-duplex time interval). As a result, CLI associated with the downlink communication may be mitigated because there may be no uplink transmissions from other UEs during the full-duplex time interval (e.g., because the network node does not perform full-duplex operations during the full-duplex time interval).

In some aspects, the UE may receive the downlink communication during a full-duplex time interval based on, in response to, or otherwise associated with a size of a guard band associated with the downlink communication satisfying a guard band threshold. The guard band may include frequency domain resources between first frequency domain resources associated with the downlink communication and second frequency domain resources associated with an uplink subband associated with the full-duplex time interval. This ensures sufficient frequency domain separation between the first frequency domain resources associated with the downlink communication and the second frequency domain resources associated with an uplink subband to enable the UE to mitigate CLI that may be caused by uplink communications transmitted via the second frequency domain resources. In other words, the size of the guard band satisfying the guard band threshold may ensure that any uplink communications that occur via the second frequency domain resources do not impact, or minimally impact on, the reception and/or measurement of the downlink communication.

In some aspects, the UE may receive and/or measure the downlink communication. The UE may detect that the measurement and/or reception of the downlink communication is impacted by CLI (e.g., is associated with excessive CLI). The UE may perform one or more actions based on, in response to, or otherwise associated with, detecting that the measurement and/or reception of the downlink communication is associated with excessive CLI. For example, the one or more actions may include refraining from including one or more measurement values in a measurement report or from applying the one or more measurement values to a calculation of a filtered measurement value (e.g., a Layer 3 (L3) measurement value) based on, in response to, or otherwise associated with the one or more measurement values indicating that the measurement of the downlink communication is impacted by CLI. As another example, the one or more actions may include transmitting a report indicating that the downlink communication is associated with CLI based on, in response to, or otherwise associated with the one or more measurement values indicating that the measurement of the downlink communication is impacted by CLI. As another example, the one or more actions may include transmitting a measurement report indicating that the downlink communication is impacted by CLI (e.g., by reporting a designated or reserved value) based on, in response to, or otherwise associated with the one or more measurement values indicating that the measurement of the downlink communication is impacted by CLI. The action may improve an accuracy of measurements performed and/or reported by the UE by enabling the UE to disregard the measurement and/or by enabling the UE to indicate to the network node when a measurement is impacted by CLI.

In some aspects, a UE may be configured or scheduled to transmit an uplink communication during a full-duplex time interval. The UE may drop (e.g., refrain from transmitting) the uplink communication based on, in response to, or otherwise associated with, the timing of the downlink communication (e.g., as described above) indicating that the downlink communication is to occur during the full-duplex time interval. In other words, when a UE is scheduled or configured to transmit an uplink communication in a full-duplex time interval that at least partially overlaps with a time interval associated with another UE performing the certain measurements and/or PDCCH monitoring, the uplink communication may be cancelled (e.g., dropped) (e.g., regardless of a priority of the uplink communication). This may ensure that no uplink communications are transmitted (e.g., during full-duplex time intervals) when another UE is scheduled or configured to perform the certain measurements and/or PDCCH monitoring. As a result, CLI (e.g., that would have otherwise been caused by the uplink communication(s)) may be mitigated.

In some other aspects, the UE that is configured or scheduled to transmit an uplink communication during the full-duplex time interval (e.g., in which the certain measurements and/or PDCCH monitoring are scheduled or configured to occur) may transmit the uplink communication with a transmit power backoff (e.g., a reduced transmit power). A value or amount of the transmit power backoff may be based on a reported CLI measurement from the UE that is scheduled or configured to perform the certain measurements and/or PDCCH monitoring. In other words, the UE may transmit the uplink communication during the full-duplex time interval using a reduced transmit power to mitigate CLI caused by the uplink communication. This may reduce a latency associated with the uplink communication and/or improve flexibility for the network node scheduling the uplink communication (e.g., because the uplink communication is allowed to occur during the full-duplex time interval with an indicated transmit power backoff).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHz) and FR2 (24.25 GHz-52.6 GHZ). Although a portion of FR1 is greater than 6 GHz, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHZ). Each of these higher frequency bands falls within the EHF band.

With these examples in mind, unless specifically stated otherwise, the term “sub-6 GHZ,” if used herein, may broadly represent frequencies that may be less than 6 GHz, may be within FR1, or may include mid-band frequencies. Further, unless specifically stated otherwise, the term “millimeter wave,” if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, an indication of one or more full-duplex time intervals; receive, from the network node, an indication of a timing of a downlink communication, the downlink communication including at least one of a reference signal for measurement or a control channel communication; and perform an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval. Additionally, or alternatively, the communication manager 140 may perform one or more other operations described herein.

In some aspects, the network node 110 may include a communication manager 150. As described in more detail elsewhere herein, the communication manager 150 may transmit an indication of one or more full-duplex time intervals; transmit an indication, for a first UE and a second UE, of a timing of a downlink communication intended for the first UE, the downlink communication including at least one of a reference signal for measurement or a control channel communication; and transmit the downlink communication, for the first UE, based at least in part on the timing of the downlink communication indicating that the downlink communication is to occur during a full-duplex time interval of the one or more full-duplex time intervals or a non-full-duplex time interval. Additionally, or alternatively, the communication manager 150 may perform one or more other operations described herein.

As indicated above, FIG. 1 is provided as an example. Other examples may differ from what is described with regard to FIG. 1.

Figure 2:
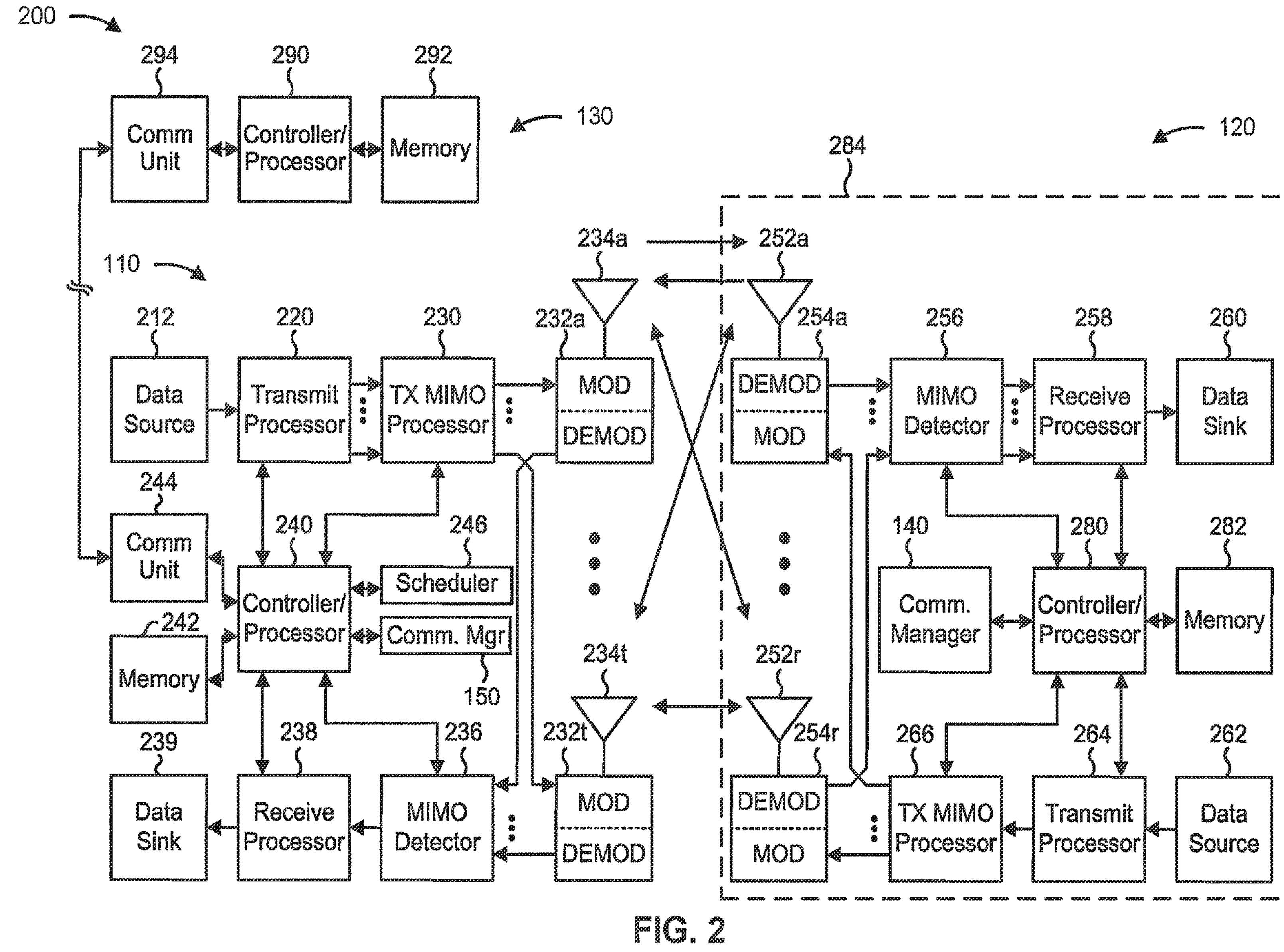
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 8-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 8-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with mitigating cross-link interference (CLI) for downlink communications, as described in more detail elsewhere herein. For example, the controller/processor 240 of the network node 110, the controller/processor 280 of the UE 120, or any other component(s) (or combinations of components) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a network node, an indication of one or more full-duplex time intervals; means for receiving, from the network node, an indication of a timing of a downlink communication, the downlink communication including at least one of a reference signal for measurement or a control channel communication; and/or means for performing an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication of one or more full-duplex time intervals; means for transmitting an indication, for a first UE and a second UE, of a timing of a downlink communication intended for the first UE, the downlink communication including at least one of a reference signal for measurement or a control channel communication; and/or means for transmitting the downlink communication, for the first UE, based at least in part on the timing of the downlink communication indicating that the downlink communication is to occur during a full-duplex time interval of the one or more full-duplex time intervals or a non-full-duplex time interval. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

As used herein, the network node 110 "outputting" or "transmitting" a communication to the UE 120 may refer to a direct transmission (e.g., from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (e.g., triggering transmission of a physical layer reference signal). Similarly, the UE 120 "transmitting" a communication to the network node 110 may refer to a direct transmission (e.g., from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "receiving" or "obtaining" a communication may refer to receiving a transmission carrying the communication directly (e.g., from the UE 120 to the network node 110) or receiving the communication (or information derived from reception of the communication) via one or more other network nodes or devices.

Figure 3:
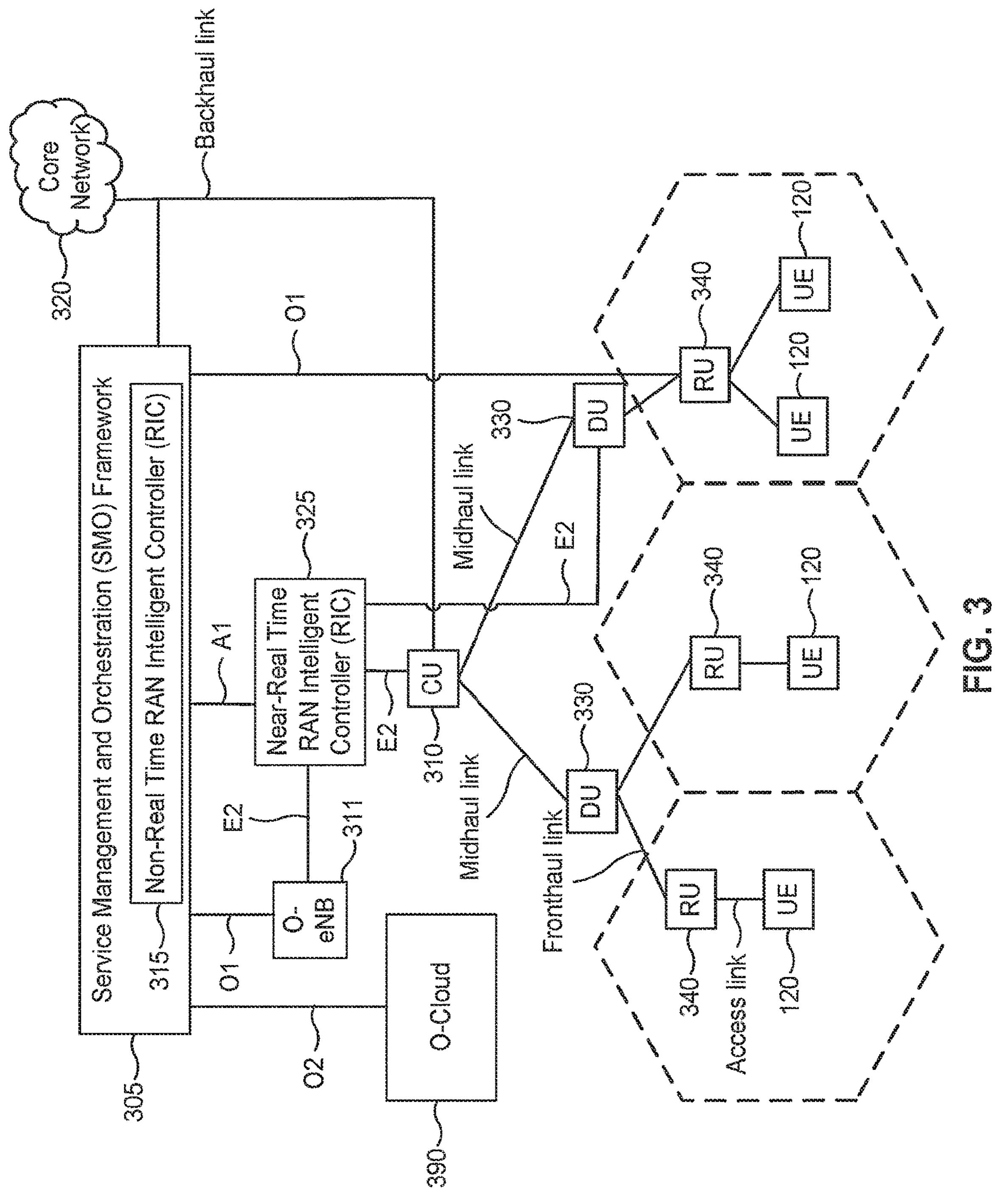
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
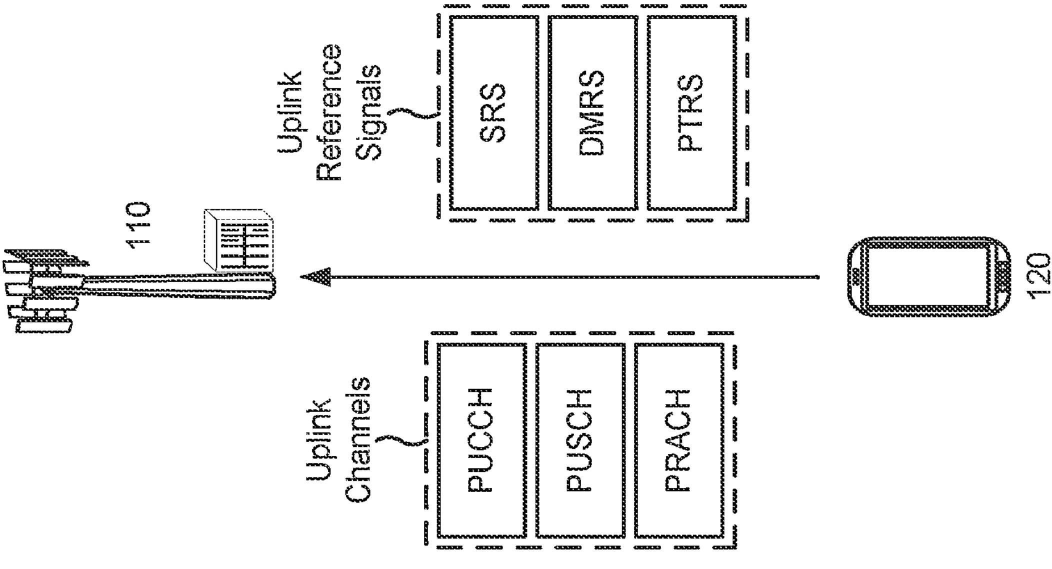
FIG. 4 is a diagram illustrating an example of physical channels and reference signals in a wireless network, in accordance with the present disclosure.
Figure 4:
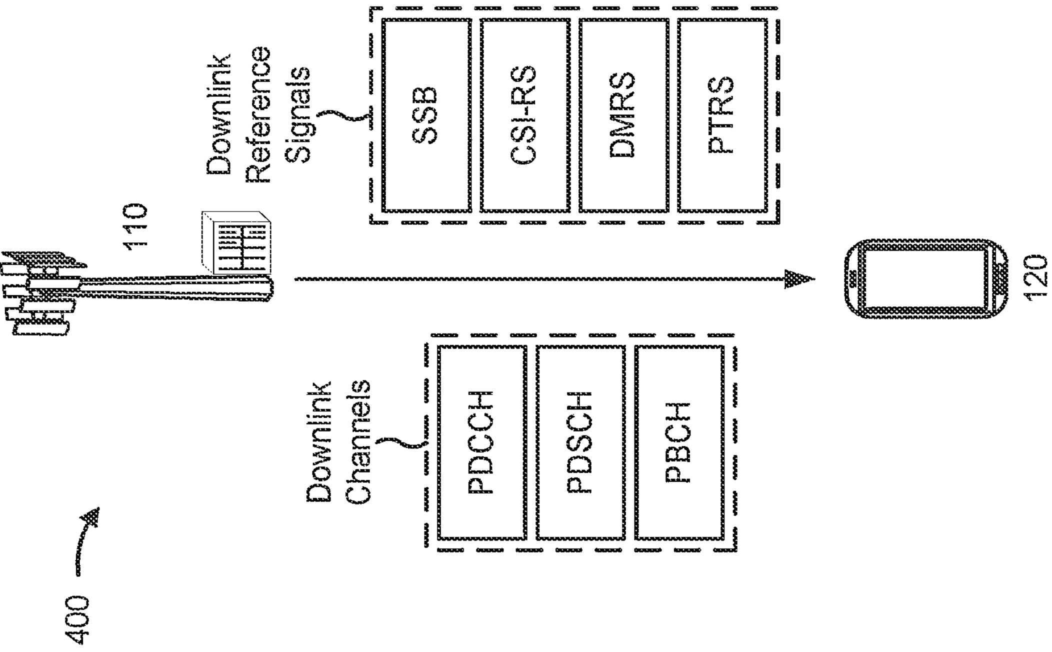

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH.

The PDCCH may be an example of a downlink control channel. In some examples, the PDCCH may be a common PDCCH. "Common" PDCCH or downlink control channel may refer to a PDCCH associated with a common search space. A search space may include all possible locations (e.g., in time and/or frequency) where a PDCCH may be located. A control resource set (CORESET) may include one or more search spaces, such as a UE-specific search space, a group-common search space, and/or a common search space, among other examples. A search space may indicate a set of control channel element (CCE) locations where the UE 120 may find PDCCHs that can potentially be used to transmit control information to the UE 120. The possible locations for a PDCCH may depend on whether the PDCCH is a UE-specific PDCCH (e.g., for a single UE) or a common PDCCH or group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

"Common PDCCH" may refer to a PDCCH associated with a common search space and/or a group-common search space. For example, a common PDCCH may be a type 0 PDCCH (e.g., associated with system information signaling), a type 0A PDCCH (e.g., associated with system information signaling), a type 1 PDCCH (e.g., associated with random access or channel access procedures, such as a random access channel (RACH) procedure), a type 2 PDCCH (e.g., associated with paging signaling), and/or a type 3 PDCCH (e.g., associated with group signaling such as power control, slot format indicator signaling, or other group-common signaling), among other examples. The types of PDCCH (e.g., type 0, type 0A, type 1, type 2, and type 3) may be defined, or otherwise fixed, by a wireless communication standard, such as the 3GPP.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some examples, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some examples, the network node 110 may calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

The UE 120 may use downlink communications (e.g., reference signals and/or PDCCH communications) for various applications or purposes. For example, the UE 120 may perform radio resource management (RRM) operations, radio link management (RLM) operations, beam failure detection (BFD) operations, tracking loop operations, mobility operations, and/or beam management operations, among other examples. Therefore, accurate measurements and/or reliable reception of the downlink communications may facilitate improved communication performance and/or efficient communication between the UE 120 and the network node 110.

For example, the RLM operations may include measuring one or more SSBs and/or one or more CSI-RSs for measurement reporting, such as RSRP reporting, RSSI reporting, RSRQ reporting, and/or signal-to-interference-plus-noise ratio (SINR) reporting, among other examples. The RRM operations (e.g., measurement reporting) may facilitate improved scheduling determinations by the network node 110 or another network entity. The RLM operations may include measuring an RLM reference signal (e.g., an SSB or CSI-RS) to determine or predict a block error rate (BLER) for a communication link (e.g., to predict radio link failure (RLF)), and/or to determine whether a communication link is in-sync or out-of-sync (e.g., based on whether the BLER satisfies a BLER threshold), among other examples. The RLM operations may facilitate improved link management, improved communication performance, and/or improved efficiency of communications between the UE 120 and the network node 110. The beam management operations may include the UE 120 measuring a BFD reference signal (e.g., a downlink reference signal) to determine or compute a BLER to detect beam failures. The beam management operations may facilitate improved beam selection and/or use by the UE 120 and/or the network node 110, thereby improving communication performance, reliability, and/or efficiency, among other examples, of communications between the UE 120 and the network node 110. A reception associated with a common PDCCH and/or a group common PDCCH may include information associated with enabling the UE 120 to establish a communication with the network node (e.g., system information and/or random access communications) or other information that facilitates network access or control information. As another example, the UE 120 may perform tracking and/or determine channel quasi co-location (QCL) properties based on downlink communication measurement or reception. For example, the UE 120 may measure a downlink reference signal (e.g., an SSB, a CSI-RS, or a tracking reference signal) for automatic gain control (AGC) operations, time domain tracking, frequency domain tracking, and/or for determining other channel properties (e.g., average delay, delay spread, Doppler shift, and/or Doppler spread), among other examples.

As indicated above, FIG. 4 is provided as an example. Other examples may differ from what is described with regard to FIG. 4.

Figure 5:
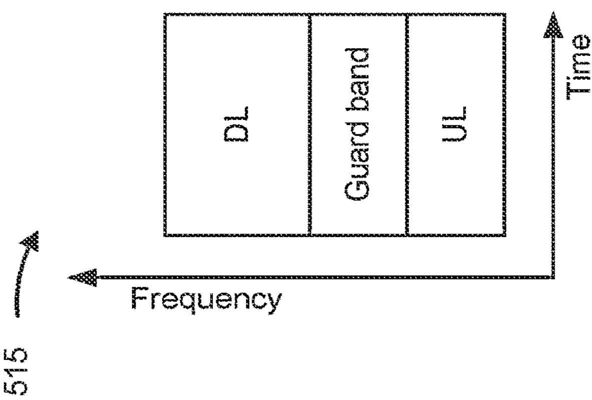
FIG. 5 is a diagram illustrating examples of full-duplex communication in a wireless network, in accordance with the present disclosure.
Figure 5:
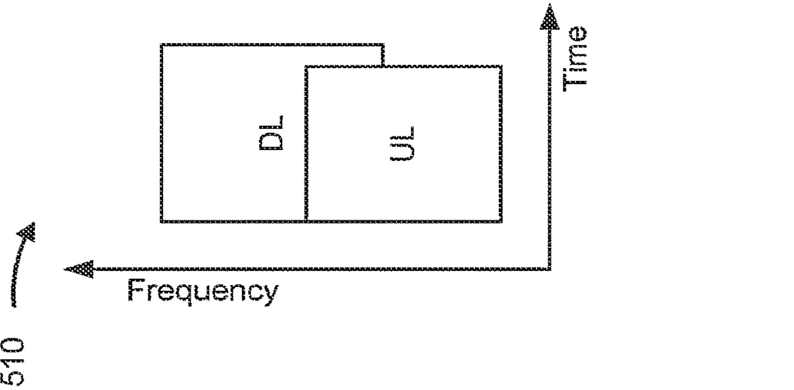
Figure 5:
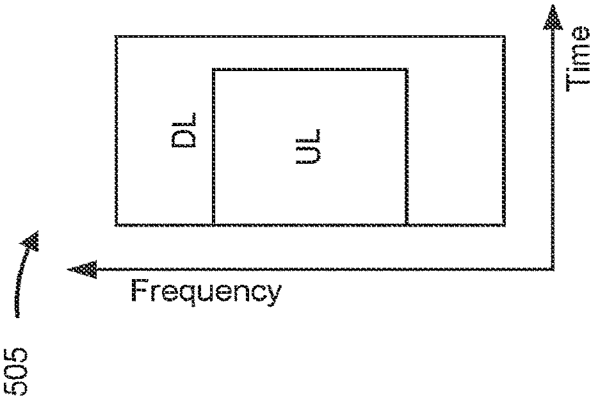

FIG. 5 is a diagram illustrating examples of full-duplex communication 500 in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" or "non-full-duplex communication" in a wireless network refers to unidirectional communications (e.g., only downlink communication or only uplink communication) between devices at a given time (e.g., in a given slot or a given symbol). For example, for full-duplex communications, a downlink bandwidth part (BWP) and an uplink BWP may be active at the same time (e.g., using the same, or at least partially overlapping, time domain resources).

As shown in FIG. 5, examples 505 and 510 show examples of in-band full-duplex (IBFD) communication. In IBFD, a UE may transmit an uplink communication to a network node and receive a downlink communication from the network node on the same time and frequency resources. In IBFD, a network node may transmit a downlink communication and receive an uplink communication on the same time and frequency resources. As shown in example 505, in a first example of IBFD, the time and frequency resources for uplink communication may fully overlap with the time and frequency resources for downlink communication. As shown in example 510, in a second example of IBFD, the time and frequency resources for uplink communication may partially overlap with the time and frequency resources for downlink communication.

As further shown in FIG. 5, example 515 shows an example of sub-band full-duplex (SBFD) communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. In SBFD, a network node may transmit a downlink communication and receive an uplink communication at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As used herein, "full-duplex time interval" may refer to a time interval configured for full-duplex operation (e.g., at the UE and/or a network node). For example, as used herein, "time interval" may refer to a transmission time interval (TTI), a slot, a symbol (e.g., an OFDM symbol), multiple symbols (e.g., a group or set of symbols), a mini-slot, and/or another time interval. A full-duplex time interval may be an IBFD time interval (e.g., in which IBFD operations are performed by the UE and/or network node) or an SBFD time interval (e.g., in which SBFD operations are performed by the UE and/or network node). In some examples, a slot configuration may include a combination of downlink slots, uplink slots, or full-duplex slots (for example, an SBFD slot or an in-band full-duplex slot). A full-duplex slot may include one or more downlink time/frequency resources and one or more uplink time/frequency resources. A downlink time/frequency resource in the full-duplex slot may be separated (for example, in time or frequency) from an uplink time/frequency resource in the full-duplex slot by a gap, which may function to reduce self-interference and improve latency and uplink coverage. For example, the gap may be a frequency offset or a frequency gap between downlink time/frequency resources and uplink time/frequency resources in the same full-duplex slot. For example, a network node may be operating in a full-duplex mode (for example, transmitting and receiving at the same time on the same or different frequency domain resources). The network node may schedule a first UE to receive a downlink communication in a full-duplex slot. The network node may schedule a second UE to transmit an uplink communication in the same full-duplex slot.

As indicated above, FIG. 5 is provided as an example. Other examples may differ from what is described with respect to FIG. 5.

Figure 6:
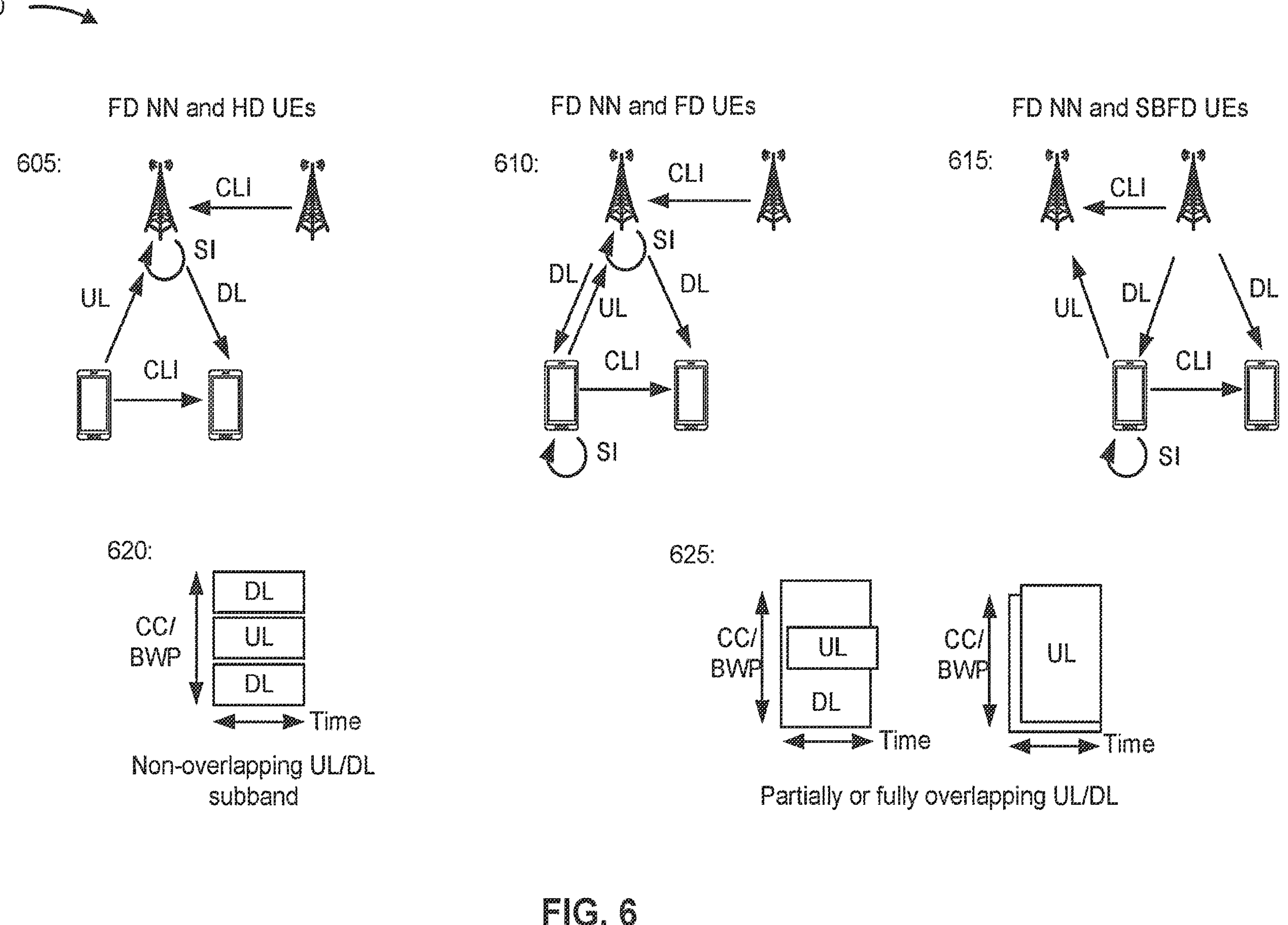
FIG. 6 is a diagram illustrating examples of full-duplex communications, in accordance with the present disclosure.

FIG. 6 is a diagram illustrating examples 600 of full-duplex communications, in accordance with the present disclosure.

As shown by reference number 605, a full-duplex network node (NN) may communicate with half-duplex UEs (e.g., UEs operating in a half-duplex mode). The full-duplex network node may be subjected to CLI from another full-duplex network node (e.g., inter-network node CLI). The full-duplex network node may experience self-interference (SI). The full-duplex network node may receive an uplink transmission from a first half-duplex UE, and the full-duplex network node may transmit a downlink transmission to a second half-duplex UE. The second half-duplex UE may be subjected to CLI from the first half-duplex UE (e.g., inter-UE CLI), where the CLI may be based at least in part on the uplink transmission from the first half-duplex UE.

As shown by reference number 610, a full-duplex network node may communicate with full-duplex UEs. The full-duplex network node may be subjected to CLI from another full-duplex network node. The full-duplex network node may experience SI. The full-duplex network node may transmit a downlink transmission to a first full-duplex UE, and the full-duplex network node may receive an uplink transmission from the first full-duplex UE at the same time as the downlink transmission. The full-duplex network node may transmit a downlink transmission to a second full-duplex UE. The second full-duplex UE may be subjected to CLI from the first full-duplex UE, where the CLI may be based at least in part on the uplink transmission from the first full-duplex UE. The first UE may experience SI.

As shown by reference number 615, a first full-duplex network node, which may be associated with multiple TRPs, may communicate with SBFD UEs. The first full-duplex network node may be subjected to CLI from a second full-duplex network node. The first full-duplex network node may receive an uplink transmission from a first SBFD UE. The second full-duplex network node may transmit downlink transmissions to both the first SBFD UE and a second SBFD UE. The second SBFD UE may be subjected to CLI from the first SBFD UE, where the CLI may be based at least in part on the uplink transmission from the first SBFD UE. The first SBFD UE may experience SI.

As shown by reference number 620, an SBFD slot may be associated with a non-overlapping uplink/downlink sub-bands. Within a component carrier bandwidth and/or a BWP, an uplink resource may be in between, in a frequency domain, a first downlink resource and a second downlink resource. The first downlink resource, the second downlink resource, and the uplink resource may all be associated with the same time domain resources.

As shown by reference number 625, a slot (e.g., a full-duplex slot) may be associated with partially or fully overlapping uplink/downlink resources. Within a component carrier bandwidth and/or a BWP, an uplink resource may fully or partially overlap with a downlink resource.

In addition to full-duplex operations, CLI may be introduced due to time division duplexing (TDD) configurations for neighboring cells. For example, in dynamic TDD, the allocation of network resources to uplink and downlink may be dynamically modified depending on a traffic load. For example, a network node (NN) 110 may configure a TDD configuration (for example, a TDD pattern) with more uplink transmission time intervals (TTIs) (for example, frames, subframes, slots, mini-slots, and/or symbols) for a UE 120 when the UE 120 has uplink data to transmit, and may configure a TDD configuration with more downlink TTIs for the UE 120 when the UE 120 has downlink data to receive. The TDD configuration may be dynamically configured to modify the allocation of uplink TTIs and downlink TTIs used for communication between the network node 110 and the UE 120. When neighboring network nodes 110 use different TDD configurations to communicate with UEs 120, this may result in a downlink communication between a first network node 110-1 and a first UE 120-1 in a same TTI as an uplink communication between a second network node 110-2 and a second UE 120-2. These communications in different transmission directions (for example, downlink vs. uplink) in the same TTI may interfere with one another, which may be referred to as CLI. For example, the second UE 120-2 may transmit, and the first UE 120-1 may receive, an uplink communication (e.g., where the uplink communication is intended for a network node 110 and not the first UE 120-1). The reception of the uplink communication by the first UE 120-1 may cause interference (for example, CLI), at the first UE 120-1, with a downlink communication from a network node 110 (e.g., the uplink communication may interfere with a downlink communication that the first UE 120-1 is attempting to receive). This CLI may be referred to as uplink-to-downlink (UL-to-DL) interference or UE-to-UE interference, among other examples. This UE-to-UE interference may occur and/or may increase when the first UE 120-1 and the second UE 120-2 are in close proximity, and may be avoided or mitigated by preventing scheduling of the UEs 120 in different transmission directions in the same TTI. In some examples, UE-to-UE interference may occur between UEs in the same cell (for example, communicating with the same network node, rather than different network nodes).

As indicated above, FIG. 6 is provided as an example. Other examples may differ from what is described with regard to FIG. 6.

Figure 7:
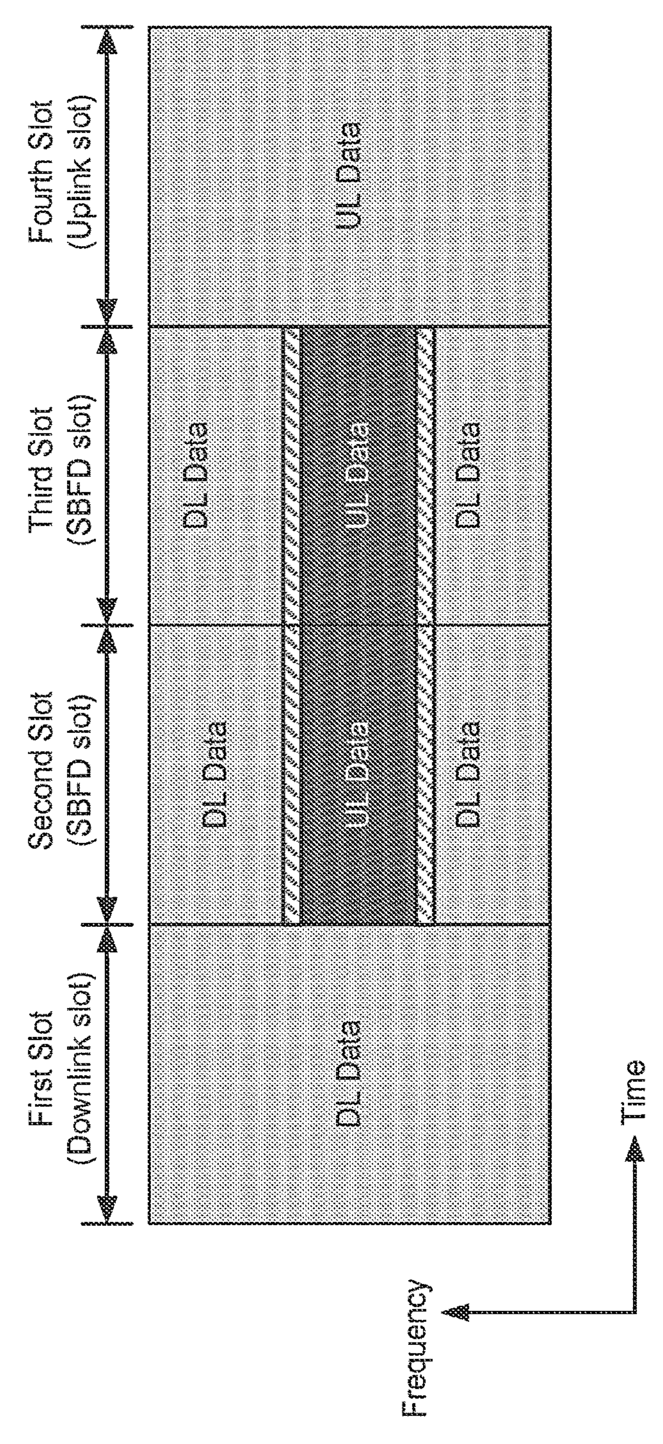
FIG. 7 is a diagram illustrating an example of a subband full-duplex slot format, in accordance with the present disclosure.
Figure 7:
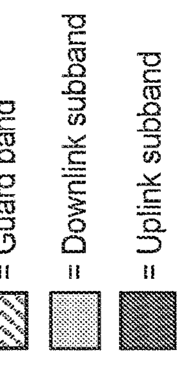

FIG. 7 is a diagram illustrating an example 700 of an SBFD slot format, in accordance with the present disclosure. An SBFD slot format may be a slot format that is defined or configured as a "downlink and uplink" slot (e.g., a "D+U" slot). The downlink and uplink slot may be a slot in which a band is used for both uplink and downlink transmissions.

The downlink and uplink transmissions may occur in overlapping bands (e.g., IBFD) or in adjacent bands (e.g., SBFD). In a given symbol of the downlink and uplink slot (e.g., the SBFD slot), a half-duplex UE may either transmit in an uplink band or receive in a downlink band. In a given symbol of the downlink and uplink slot, a full-duplex UE may transmit in an uplink band and/or receive in a downlink band (e.g., in the same slot). The downlink and uplink slot may include downlink only symbols, uplink only symbols, or full-duplex symbols.

As shown in FIG. 7, a first slot may be associated with downlink data for a first UE. A second slot (e.g., an SBFD slot) may be associated with downlink data for the first UE, uplink data for the first UE, and downlink data for a second UE. The uplink data may be associated with a PUSCH transmission. A third slot (e.g., an SBFD slot) may be associated with downlink data for the first UE, uplink data for the first UE, and downlink data for the second UE. A fourth slot may be associated with uplink data for the first UE.

As indicated above, FIG. 7 is provided as an example. Other examples may differ from what is described with regard to FIG. 7.

CLI may negatively impact operations at a UE 120 associated with a reception or measurement of a downlink communication. For example, the UE 120 may perform a measurement of a downlink reference signal in a downlink subband of a full-duplex time interval (e.g., an SBFD slot). The measurement of the downlink reference signal may be negatively impacted by CLI introduced by uplink transmissions (e.g., from other UEs) in an uplink subband of the full-duplex time interval. For example, an accuracy of the measurement and/or a reception performance of a downlink communication may be negatively impacted by CLI.

In some cases, one or more uplink transmissions that cause the CLI may cause saturation of one or more radio frequency (RF) components of the UE 120. "Saturation" of an RF component refers to a state where the RF component is no longer able to accurately amplify or process an incoming signal due to a limitation in one or more physical capabilities of the RF component. In an RF component, such as an amplifier (e.g., a low-noise amplifier (LNA)), a mixer, an analog-to-digital converter (ADC), or another RF component, the ability to amplify or process a signal is determined by dynamic range of the RF component. The dynamic range is the range of signal amplitudes that the component can accurately process, without introducing distortion or non-linear effects. When the input signal to an RF component exceeds the upper limit of the dynamic range, the RF component becomes saturated. In this state, the RF component is no longer able to accurately amplify or process the signal, and the output signal will be distorted. This distortion can take the form of clipping or flattening of the waveform, because the RF component is unable to accurately reproduce the peaks and valleys of the signal. The one or more uplink transmissions that cause the CLI may result in a saturation of an RF component of the UE 120, resulting in the UE 120 being unable to receive or process a downlink communication. Further, the one or more uplink transmissions that cause the CLI may cause damage to the RF component(s) of the UE 120. In other words, the one or more uplink transmissions may cause jamming at the UE 120, resulting in the UE 120 being unable to receive or process downlink communications and/or causing damage to RF components of the UE 120.

As another example, the one or more uplink transmissions (e.g., associated with causing CLI) may cause a loss of a dynamic range of an RF component of the UE 120 (e.g., of an ADC of the UE 120). For example, if a power of the one or more uplink transmissions is greater than a power of a downlink communication received by the UE 120, then the UE 120 may set a dynamic range of the RF component higher (e.g., to avoid or mitigate a risk of saturation of the RF component). As a result, the downlink communication may be received by the UE 120 at least partially outside of the dynamic range of the RF component, resulting in degraded processing and/or performance of the downlink communication. Additionally, or alternatively, the one or more uplink transmissions may result in leakage (e.g., the one or more uplink transmissions may "leak" into frequency resources associated with the downlink communication). The leakage may result in increased interference in a downlink subband. The increased interference may reduce an SINR measurement of a downlink communication that is measured by the UE 120. As a result, CLI caused by the one or more uplink transmissions may negatively impact performance and/or reliability of a downlink communication received during a full-duplex time interval and/or an accuracy of a measurement performed during a full-duplex time interval.

Some aspects described herein enable mitigating CLI for downlink communications (e.g., in the presence of inter-UE CLI). For example, a UE may receive an indication of a timing of a downlink communication (e.g., a reference signal for measurement and/or a control channel communication). In some aspects, one or more rules or constraints may be defined for indicating allowable time intervals during which certain measurement types (e.g., cell-based measurements) and/or certain PDCCH monitoring may occur. For example, the UE may receive the downlink communication and/or measure the downlink communication based on, in response to, or otherwise associated with the timing of the downlink communication indicating that the downlink communication is to occur during a time interval that is not associated with full-duplex operations (e.g., a non-full-duplex time interval). In other words, when the UE is scheduled or configured to perform certain measurements (e.g., tracking measurements, AGC measurements, RLM measurements, RRM measurements, beam management measurement, and/or BFD measurements) and/or configured or scheduled to perform PDCCH monitoring for a common search space (CSS), then the UE may expect that the time interval associated with the measurements and/or the PDCCH monitoring are not configured or indicated as being associated with full-duplex operations (e.g., may expect that the interval associated with the measurements and/or the PDCCH monitoring is a non-full-duplex time interval).

As a result, CLI associated with the downlink communication may be mitigated. For example, because the UE receives an indication of time intervals in which a network node is to perform full-duplex operations (e.g., the UE may receive an indication of one or more full-duplex time intervals), the UE is enabled to identify time intervals during which the certain measurements and/or PDCCH monitoring should occur to avoid or mitigate CLI caused by transmissions from other UEs (e.g., that may occur during full-duplex time intervals). This improves an accuracy of measurements performed by the UE using the downlink communication and/or improves a communication performance of the downlink communication. For example, a likelihood that an RF component of the UE becomes saturated and/or that a dynamic range of an RF component of the UE is set incorrectly may be reduced, thereby improving the performance of the UE when receiving and/or measuring the downlink communication.

In some aspects, the UE may drop (or refrain from receiving or measuring) the downlink communication based on, in response to, or otherwise associated with the timing of the downlink communication indicating that the downlink communication is to occur during a full-duplex time interval. In some aspects, the UE may receive and/or measure the downlink communication during a full-duplex time interval based on, in response to, or otherwise associated with the network node refraining from performing full-duplex operations during the full-duplex time interval. In other words, if the timing of the downlink communication indicates that the downlink communication is to occur during a full-duplex time interval, then the network node may refrain from performing full-duplex operations during the full-duplex time interval. The UE may assume that the network node does not perform full-duplex operations during the full-duplex time interval (e.g., based on, in response to, or otherwise associated with the timing of the downlink communication indicating that the downlink communication is to occur during a full-duplex time interval). As a result, CLI associated with the downlink communication may be mitigated because there may be no uplink transmissions from other UEs during the full-duplex time interval (e.g., because the network node does not perform full-duplex operations during the full-duplex time interval).

In some aspects, the UE may receive the downlink communication during a full-duplex time interval based on, in response to, or otherwise associated with a size of a guard band associated with the downlink communication satisfying a guard band threshold. The guard band may include frequency domain resources between first frequency domain resources associated with the downlink communication and second frequency domain resources associated with an uplink subband associated with the full-duplex time interval. This ensures sufficient frequency domain separation between the first frequency domain resources associated with the downlink communication and the second frequency domain resources associated with an uplink subband to enable the UE to mitigate CLI that may be caused by uplink communications transmitted via the second frequency domain resources. In other words, the size of the guard band satisfying the guard band threshold may ensure that any uplink communications that occur via the second frequency domain resources do not impact, or have a minimal impact on, the reception and/or measurement of the downlink communication.

In some aspects, the UE may receive and/or measure the downlink communication. The UE may detect that the measurement and/or reception of the downlink communication is impacted by CLI (e.g., is associated with excessive CLI). The UE may perform one or more actions based on, in response to, or otherwise associated with, detecting that the measurement and/or reception of the downlink communication is associated with excessive CLI. For example, the one or more actions may include refraining from including one or more measurement values in a measurement report or from applying the one or more measurement values to a calculation of a filtered measurement value (e.g., a Layer 3 (L3) measurement value) based on, in response to, or otherwise associated with the one or more measurement values indicating that the measurement of the downlink communication is impacted by CLI. As another example, the one or more actions may include transmitting a report indicating that the downlink communication is associated with CLI based on, in response to, or otherwise associated with the one or more measurement values indicating that the measurement of the downlink communication is impacted by cross-link interference. As another example, the one or more actions may include transmitting a measurement report indicating that the downlink communication is impacted by CLI (e.g., by reporting a designated or reserved value) based on, in response to, or otherwise associated with the one or more measurement values indicating that the measurement of the downlink communication is impacted by CLI. The action may improve an accuracy of measurements performed and/or reported by the UE by enabling the UE to disregard the measurement and/or by enabling the UE to indicate to the network node when a measurement is impacted by CLI.

In some aspects, a UE may be configured or scheduled to transmit an uplink communication during a full-duplex time interval. The UE may drop (e.g., refrain from transmitting) the uplink communication based on, in response to, or otherwise associated with, the timing of the downlink communication (e.g., described above) indicating that the downlink communication is to occur during the full-duplex time interval. In other words, when a UE is scheduled or configured to transmit an uplink communication in a full-duplex time interval that at least partially overlaps with a time interval associated with another UE performing the certain measurements and/or PDCCH monitoring, the uplink communication may be cancelled (e.g., dropped) (e.g., regardless of a priority of the uplink communication). This may ensure that no uplink communications are transmitted (e.g., during full-duplex time intervals) when another UE is scheduled or configured to perform the certain measurements and/or PDCCH monitoring. As a result, CLI (e.g., that would have otherwise been caused by the uplink communication (s)) may be mitigated.

In some other aspects, the UE that is configured or scheduled to transmit an uplink communication during the full-duplex time interval (e.g., in which the certain measurements and/or PDCCH monitoring is scheduled or configured to occur) may transmit the uplink communication with a transmit power backoff (e.g., a reduced transmit power). A value or amount of the transmit power backoff may be based on a reported CLI measurement from the UE that is scheduled or configured to perform the certain measurements and/or PDCCH monitoring. In other words, the UE may transmit the uplink communication during the full-duplex time interval using a reduced transmit power to mitigate CLI caused by the uplink communication. This may reduce a latency associated with the uplink communication and/or improve flexibility for the network node scheduling the uplink communication (e.g., because the uplink communication is allowed to occur during the full-duplex time interval with an indicated transmit power backoff).

Figure 8:
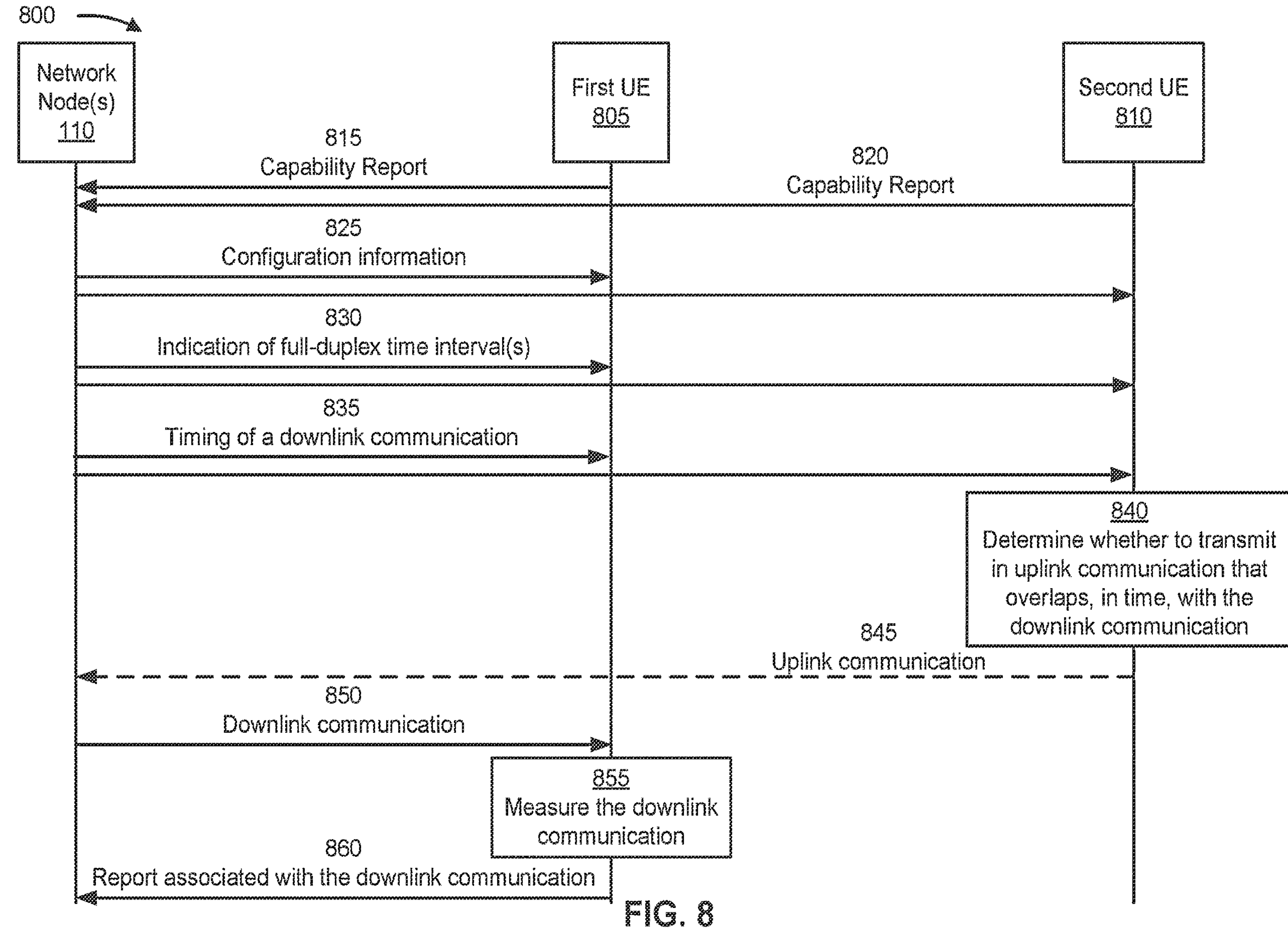
FIG. 8 is a diagram of an example associated with mitigating cross-link interference for downlink communications, in accordance with the present disclosure.

FIG. 8 is a diagram of an example 800 associated with mitigating CLI for downlink communications, in accordance with the present disclosure. As shown in FIG. 8, one or more network nodes 110 (for example, a base station, a CU, a DU, and/or an RU) may communicate with a first UE 805 (e.g., a UE 120) and/or a second UE 810 (e.g., a UE 120). In some aspects, the network node 110, the first UE 805, and the second UE 810 may be part of a wireless network (e.g., the wireless network 100). The first UE 805 and the network node 110 (and/or the second UE 810 and the network node 110) may have established a wireless connection prior to operations shown in FIG. 8. In some aspects, the network node 110 may be associated with two or more TRPs, antennas, and/or antenna panels. The two or more TRPs, antennas, and/or antenna panels may be non-co-located (for example, may be located in different physical locations and/or may be separated by a distance).

As shown by reference number 815, the first UE 805 may transmit, and the network node 110 may receive, a capability report associated with the first UE 805. Similarly, as shown by reference number 820, the second UE 810 may transmit, and the network node 110 may receive, a capability report associated with the second UE 810. The first UE 805 and/or the second UE 810 may transmit the capability report via UE capability signaling, a UE assistance information (UAI) communication, an uplink control information communication, an RRC communication, a PUSCH, and/or a PUCCH, among other examples. The capability report(s) may indicate UE support for one or more operations described herein. For example, the capability report(s) may indicate whether the first UE 805 and/or the second UE 810 supports receiving a downlink communication (e.g., a reference signal for measurement and/or a control channel communication) during full-duplex time intervals.

In some aspects, the capability report(s) may indicate whether the first UE 805 and/or the second UE 810 supports receiving an indication of one or more full-duplex time intervals, as described in more detail elsewhere herein. For example, the capability report(s) may indicate whether the first UE 805 and/or the second UE 810 supports identifying a slot pattern (for example, a slot format pattern) for full-duplex slots, symbols, or other time intervals. In some aspects, the capability report(s) may indicate whether the first UE 805 and/or the second UE 810 supports receiving an indication of frequency domain locations of uplink subband (s) and/or downlink subband(s) associated with full-duplex time intervals (e.g., associated with a SBFD time interval). In some aspects, the capability report(s) may indicate whether the first UE 805 and/or the second UE 810 supports selectively transmitting or receiving communications based on, in response to, or otherwise associated with an indicated downlink communication occurring during a full-duplex time interval. In some aspects, the capability report(s) may indicate whether the first UE 805 and/or the second UE 810 supports selectively dropping (e.g., refraining from transmitting) an uplink communication during a time interval that at least partially overlaps with a time interval during which another UE is scheduled or configured to perform certain downlink measurements or PDCCH monitoring. In some aspects, the capability report(s) may indicate whether the first UE 805 and/or the second UE 810 supports applying a transmit power backoff for uplink communication(s) during a time interval that at least partially overlaps with a time interval during which another UE is scheduled or configured to perform certain downlink measurements or PDCCH monitoring, as described in more detail elsewhere herein.

As used herein, "selectively" performing an operation means to either perform the operation or refrain from performing the operation. For example, selectively performing an operation based on, in response to, or otherwise associated with whether a condition is satisfied means that the operation is performed if the condition is satisfied and that the operation is not performed if the condition is not satisfied (or vice versa). Thus, selectively performing an operation may include determining whether to perform the operation and then either performing the operation or refraining from performing the operation based on, in response to, or otherwise associated with that determination.

As used herein, "selectively" performing a first operation or a second operation means to perform either the first operation or the second operation. For example, selectively performing a first operation or a second operation based on, in response to, or otherwise associated with whether a condition is satisfied means that the first operation is performed if the condition is satisfied and that the second operation is performed if the condition is not satisfied (or vice versa). Thus, selectively performing a first operation or a second operation may include determining whether to perform either the first operation or the second operation and then performing either the first operation or the second operation based on, in response to, or otherwise associated with that determination.

As used herein, "full-duplex" may refer to SBFD, in-band full-duplex (for example, with partially or fully overlapping frequency domain resources) and/or another full-duplex type or mode. "Time interval" may refer to a slot, an OFDM symbol, a mini-slot (for example, one or more symbols within a slot), and/or another time interval. For example, "full-duplex time interval" may refer to an SBFD slot, an SBFD symbol, an in-band full-duplex slot, and/or an in-band full-duplex symbol, among other examples.

The network node 110 may configure the first UE 805 and/or the second UE 810 in accordance with the capability report(s). For example, the network node 110 may configure, or may trigger, the first UE 805 and/or the second UE 810 to perform one or more operations based on, in response to, or otherwise associated with the capability report(s) indicating that the first UE 805 and/or the second UE 810 supports the one or more operations.

As shown by reference number 825, the network node 110 may transmit, and the first UE 805 and/or the second UE 810 may receive, configuration information. In some aspects, the first UE 805 and/or the second UE 810 may receive the configuration information via one or more of system information signaling. RRC signaling, one or more MAC-CEs, and/or DCI, among other examples. In some aspects, the configuration information may include an indication of one or more configuration parameters for selection by the first UE 805 and/or the second UE 810, and/or explicit configuration information for the first UE 805 and/or the second UE 810 to use to configure itself, among other examples. In some aspects, the network node 110 may transmit first configuration information for the first UE 805 and second configuration information for the second UE 810. Additionally, or alternatively, the network node 110 may transmit common configuration information (e.g., in a group common or broadcast communication) for both the first UE 805 and the second UE 810.

In some aspects, the configuration information may indicate that the first UE 805 and/or the second UE 810 should expect that certain measurement types and/or certain PDCCH monitoring are to occur during non-full-duplex time intervals. The certain measurement types may include cell-based measurements, RRM measurements (e.g., associated with an RRM reference signal), RLM measurements (e.g., associated with an RLM reference signal), tracking reference signal measurements, AGC measurements (e.g., associated with an AGC reference signal), beam failure detection measurements (e.g., associated with a beam failure detection reference signal), beam management measurements (e.g., associated with a beam management reference signal), SSB measurements, and/or CSI-RS measurements, among other examples. The certain PDCCH monitoring may include PDCCH monitoring associated with a CSS, PDCCH monitoring associated with a common PDCCH, PDCCH monitoring associated with a group common PDCCH, or PDCCH monitoring associated with a given PDCCH type (e.g., type 0, type 0A, type 1, type 2, and/or type 3), among other examples. In some aspects, the configuration information may indicate the certain measurement types and/or the certain PDCCH monitoring.

In some aspects, the configuration information may indicate that if the certain measurement types and/or the certain PDCCH monitoring are scheduled or configured to occur (e.g., for the first UE 805, the second UE 810, or another UE) during a full-duplex time interval, then the first UE 805 and/or the second UE 810 may assume that the network node 110 is not operating in a full-duplex mode during the full-duplex time interval. In other words, the configuration information may indicate that if the certain measurement types and/or the certain PDCCH monitoring are scheduled or configured to occur during a full-duplex time interval, then the network node 110 may not operate in a full-duplex mode (e.g., may operate in a half-duplex mode) during the full-duplex time interval. In some aspects, the configuration information may indicate that if the certain measurement types and/or the certain PDCCH monitoring are scheduled or configured to occur during a full-duplex time interval, then the first UE 805 and/or the second UE 810 may treat the full-duplex time interval as a downlink time interval (e.g., in which only downlink operations are performed).

In some aspects, the configuration information may indicate that if the certain measurement types and/or the certain PDCCH monitoring are scheduled or configured to occur (e.g., for the first UE 805, the second UE 810, or another UE) during a full-duplex time interval, then the first UE 805 and/or the second UE 810 may perform the certain measurement types and/or the certain PDCCH monitoring if a guard band between a scheduled or configured downlink communication (e.g., associated with the certain measurement types and/or the certain PDCCH monitoring) and an uplink subband satisfies a guard band threshold. For example, the configuration information may indicate a value of the guard band threshold.

In some aspects, the configuration information may indicate that if the certain measurement types and/or the certain PDCCH monitoring are scheduled or configured to occur (e.g., for the first UE 805, the second UE 810, or another UE) during a full-duplex time interval, then the first UE 805 and/or the second UE 810 are to drop (e.g., refrain from transmitting) uplink communications during a time-interval that at least partially overlaps with the full-duplex time interval. In other aspects, the configuration information may indicate that if the certain measurement types and/or the certain PDCCH monitoring are scheduled or configured to occur (e.g., for the first UE 805, the second UE 810, or another UE) during a full-duplex time interval, then the first UE 805 and/or the second UE 810 are to transmit uplink communications during a time-interval that at least partially overlaps with the full-duplex time interval using an indicated transmit power backoff. In some aspects, the configuration information may indicate a value of the transmit power backoff to be applied by the first UE 805 and/or the second UE 810.

In some aspects, the configuration information may indicate that the first UE 805 and/or the second UE 810 are to report when a downlink communication (e.g., a measurement of the downlink communication and/or PDCCH monitoring) is impacted by CLI. For example, the configuration information may indicate a reporting configuration indicating information associated with the first UE 805 and/or the second UE 810 reporting when a downlink communication (e.g., a measurement of the downlink communication and/or PDCCH monitoring) is impacted by CLI. In some aspects, the configuration information may indicate one or more values (e.g., dedicated values and/or reserved values) that are to be used to indicate that a measurement is impacted by CLI.

In some aspects, the configuration information may indicate that one or more full-duplex time intervals are to be used by the network node 110 and/or the first UE 805 and/or the second UE 810. For example, the configuration information may indicate that full-duplex operations are enabled for the network node 110. The full-duplex operations performed by the network node 110 may include subband-full-duplex operations and/or in-band full-duplex operations (for example, associated with partially or fully overlapping frequency domain resources). For example, the network node 110 may use a first TRP and/or a first antenna panel for receiving uplink signals at the same time as using a second TRP and/or a second antenna panel for transmitting downlink signals.

In some aspects, the configuration information may include an indication of one or more full-duplex time intervals. For example, the configuration information may indicate a pattern of time intervals associated with full-duplex operations at the network node 110. For example, the configuration information may indicate one or more time intervals during which the network node 110 is operating in a full-duplex mode. In some aspects, the configuration information may indicate a slot pattern. For example, the configuration information may include a TDD configuration. The slot pattern may indicate a duplex type or duplex mode for respective slots. For example, the slot pattern may indicate a pattern of uplink slots, downlink slots, and/or full-duplex slots (for example, subband-full-duplex slots).

The first UE 805 and/or the second UE 810 may configure themselves based at least in part on the configuration information. In some aspects, the first UE 805 and/or the second UE 810 may be configured to perform one or more operations described herein based at least in part on the configuration information.

As shown by reference number 830, the network node 110 may transmit, and the first UE 805 and/or the second UE 810 may receive, an indication of one or more full-duplex time intervals. In some aspects, the indication of one or more full-duplex time intervals may be included in the configuration information, as described above. In other examples, the indication of one or more full-duplex time intervals may be included in a communication separate from the configuration information. In some aspects, the first UE 805 and/or the second UE 810 may receive a TDD pattern indicating a slot format pattern. The slot pattern may indicate one or more full-duplex slots, symbols, or other time intervals. The slot format pattern may repeat over time. For example, the first UE 805 and/or the second UE 810 may receive the indication of one or more full-duplex time intervals via a slot format pattern in a similar manner as described in connection with FIGS. 5-7. A slot is described above as an example of a time interval, and the first UE 805 and/or the second UE 810 may receive an indication of other full-duplex time intervals in a similar manner.

In some aspects, the network node 110 may transmit, and the first UE 805 and/or the second UE 810 may receive, an indication to switch to a slot format pattern that includes full-duplex slots. For example, the network node 110 may transmit, and the first UE 805 and/or the second UE 810 may receive, a communication (for example, an RRC communication, a MAC-CE communication, and/or a DCI communication) that indicates that the first UE 805 and/or the second UE 810 are to switch from a first slot format pattern (for example, that does not include full-duplex time intervals) to a second slot format pattern (for example, that does include full-duplex time intervals). The first UE 805 and/or the second UE 810 may identify one or more full-duplex time intervals based on, in response to, or otherwise associated with the pattern (for example, the slot format pattern). In other words, the first UE 805 and/or the second UE 810 may identify one or more time intervals during which the network node 110 is operating in a full-duplex mode.

As shown by reference number 835, the network node 110 may transmit, and the first UE 805 and/or the second UE 810 may receive, an indication of a timing of a downlink communication. The downlink communication may be intended for, or otherwise associated with, the first UE 805. The second UE 810 may receive the indication of the timing of the downlink communication because the indication of the timing of the downlink communication may be broadcast, groupcast, and/or otherwise transmitted to the second UE 810 (e.g., in addition to the first UE 805).

The indication of the timing of the downlink communication may be included in a scheduling communication, such as a DCI communication. As another example, the indication of the timing of the downlink communication may be included in a configuration of the downlink communication, such as in an RRC communication and/or a MAC-CE communication, among other examples. For example, the downlink communication may be a reference signal for measurement. The indication of the timing of the downlink communication may be included in a configuration of the reference signal (e.g., indicated by a periodicity associated with the reference signal). The reference signal may be a radio resource management reference signal, a radio link management reference signal, a tracking reference signal, an AGC reference signal, a beam failure detection reference signal, a beam management reference signal, an SSB signal, and/or a CSI-RS, among other examples. For example, the reference signal may be included in one or more reference signal types (e.g., that are associated with performing measurements for a given operation, such as an RRM operation, an RLM operation, and/or a BFD operation, among other examples). The one or more reference signal types may be associated with performing operations that facilitate and/or enhance communication performance between a UE (e.g., the first UE 805 and/or the second UE 810) and the network node 110. Therefore, the first UE 805 and/or the second UE 810 may perform one or more operations described herein to mitigate inter-UE CLI associated with reference signals that are associated with the one or more reference signal types.

Additionally, or alternatively, the downlink communication may be a control channel communication (e.g., a PDCCH communication). For example, the first UE 805 may be configured to monitor the PDCCH. The indication of the timing of the downlink communication may be indicated via a control channel configuration (e.g., a PDCCH configuration), a control resource set (CORESET) configuration, and/or a search space configuration, among other examples. For example, the control channel communication may be associated with indicating system information and/or other information to facilitate accessing and/or establishing a communication link with the network node 110. The control channel communication may be a common PDCCH, associated with a common search space, associated with a group common search space, a type 0 PDCCH (e.g., associated with system information signaling), a type 0A PDCCH (e.g., associated with system information signaling), a type 1 PDCCH (e.g., associated with random access or channel access procedures, such as a random access channel (RACH) procedure), a type 2 PDCCH (e.g., associated with paging signaling), and/or a type 3 PDCCH (e.g., associated with group signaling such as power control, slot format indicator signaling, or other group-common signaling), among other examples. Therefore, the first UE 805 and/or the second UE 810 may perform one or more operations described herein to mitigate inter-UE CLI associated with the control channel communication (e.g., to improve a likelihood that the first UE 805 is able to successfully receive, decode, and/or process the control channel communication to obtain the system information and/or other information to facilitate accessing and/or establishing a communication link with the network node 110).

As shown by reference number 840, the second UE 810 may determine whether to transmit an uplink communication based on, in response to, or otherwise associated with the timing of the downlink communication and a timing of the uplink communication. For example, the timing of the downlink communication may indicate that the downlink communication is to occur during a full-duplex time interval. The second UE 810 may determine that the uplink communication is to occur during the full-duplex time interval and/or during a time interval that at least partially overlaps with the full-duplex time interval. For example, the second UE 810 may receive a scheduling communication (e.g., DCI) and/or configuration information indicating the timing of the uplink communication.

In some aspects, the second UE 810 may drop (e.g., refrain from transmitting) the uplink communication based on, in response to, or otherwise associated with the timing of the downlink communication indicating that the downlink communication is to occur during the full-duplex time interval (e.g., that at least partially overlaps with a time interval associated with the uplink communication). For example, when the second UE 810 is scheduled or configured to transmit an uplink communication in a time interval that at least partially overlaps with the full-duplex time interval used to perform the downlink communication (e.g., that is associated with a given reference signal type and/or control channel type), then the second UE 810 may determine that the uplink communication is cancelled and/or is to be dropped (e.g., to mitigate CLI associated with the downlink communication). Similarly, the network node 110 may drop (e.g., refrain from receiving) the uplink communication (e.g., based on, in response to, or otherwise associated with the timing of the downlink communication indicating that the downlink communication is to occur during the full-duplex time interval that at least partially overlaps with a time interval associated with the uplink communication).

In some aspects, the second UE 810 may drop the uplink communication regardless of a priority level of the uplink communication (e.g., may always drop the uplink communication). In other aspects, the second UE 810 may drop the uplink communication based on, in response to, or otherwise associated with the uplink communication having a lower (or equal) priority level than a priority level of the downlink communication. For example, one or more rules may be defined for handling conflicts between a downlink communication (e.g., a given reference signal type) and an uplink communication that are scheduled to occur in a given full-duplex time interval.

In some aspects, as shown by reference number 845, the second UE 810 may transmit the uplink communication. For example, the second UE 810 may transmit the uplink communication based on, in response to, or otherwise associated with the timing of the uplink communication indicating that the uplink communication is to occur in a non-fullduplex time interval (e.g., during an uplink time interval) and/or during a time interval that does not overlap, in the time domain, with the full-duplex time interval. For example, the second UE 810 may be enabled to transmit the uplink communication. This may reduce a latency associated with the uplink communication, may improve a performance or user experience of the second UE 810, and/or may increase an uplink throughput associated with the second UE 810, among other examples.

In some aspects, the second UE 810 may transmit the uplink communication during the full-duplex time interval (e.g., the full-duplex time interval during which the downlink communication is scheduled or configured to occur). For example, the second UE 810 may transmit the uplink communication during the full-duplex time interval subject to one or more transmission restraints or restrictions. In some aspects, the one or more transmission restraints or restrictions may be associated with a transmit power used by the second UE 810 to transmit the uplink communication, and/or a timing of the uplink communication, among other examples.

For example, the network node 110 may transmit, and the second UE 810 may receive, an indication of a transmit power backoff to be applied by the second UE 810 (e.g., for the uplink communication), such as in a dynamic power control command. The transmit power backoff may indicate an amount by which the second UE 810 is to reduce the transmit power for the uplink communication. The network node 110 may determine a value of the transmit power backoff. In some aspects, the network node 110 may determine the value of the transmit power backoff based on, in response to, or otherwise associated with an amount of CLI measured or experienced by the first UE 805 (e.g., CLI caused by uplink communications from the second UE 810).

For example, the first UE 805 and/or the second UE 810 may be configured with one or more CLI measurement resources (e.g., time domain, frequency domain, and/or spatial domain resources during which the second UE 810 is to transmit one or more uplink communications and the first UE 805 is to measure CLI). For example, during the one or more CLI measurement resources, the second UE 810 may transmit one or more uplink communications (e.g., an uplink reference signal, such as an SRS). The first UE 805 may measure the one or more uplink communications to determine an amount of CLI caused at the first UE 805 by uplink transmissions from the second UE 810. The first UE 805 may transmit, and the network node 110 may receive, a CLI measurement report indicating the amount of CLI (e.g., indicating one or more CLI measurements performed by the first UE 805). The network node 110 may determine the value of the transmit power backoff based on, in response to, or otherwise associated with the one or more CLI measurements performed by the first UE 805. For example, if the one or more CLI measurements indicate a high level of CLI, then the network node 110 may determine a larger value for the transmit power backoff. If the one or more CLI measurements indicate a low level of CLI, then the network node 110 may determine a smaller value for the transmit power backoff. In other words, the network node 110 may determine the value of the transmit power backoff to result in no, or a mitigated, CLI at the first UE 805 caused by uplink transmissions from the second UE 810.

The second UE 810 may transmit, during the full-duplex time interval, the uplink communication using a transmit power that is modified by the transmit power backoff. In other words, the second UE 810 may receive the indication of the transmit power backoff (e.g., via a dynamic power control command). The second UE 810 may apply the transmit power backoff to a determined or calculated transmit power for the uplink communication. This may enable the second UE 810 to transmit the uplink communication during the full-duplex time interval (e.g., during which the downlink communication is scheduled or configured to occur) while also reducing or mitigating the CLI at the first UE 805 caused by the transmission of the uplink communication.

As shown by reference number 850, the network node 110 may transmit, and the first UE 805 may receive, the downlink communication. In some aspects, the network node 110 may transmit, and the first UE 805 may receive, the downlink communication based on, in response to, or otherwise associated with the timing of the downlink communication indicating that the downlink communication is to occur during a non-full-duplex time interval (e.g., during a downlink time interval or a flexible time interval). In other words, the first UE 805 may expect that a downlink communication that is associated with the one or more reference signal types (e.g., reference signal measurement types) and/or one or more types of control channel communications (e.g., common PDCCH and/or group common PDCCH) is to be scheduled or configured during a non-full-duplex time interval (e.g., during a downlink time interval or a flexible time interval).

If the timing of the downlink communication indicates that the downlink communication is to occur during a full-duplex time interval, then the network node 110 may transmit, and the first UE 805 may receive, the downlink communication based on, in response to, or otherwise associated with the network node 110 refraining from performing full-duplex operations during the full-duplex time interval. For example, the first UE 805 may assume that there is no full-duplex operation at the network node 110 during the full-duplex time interval. The network node 110 may refrain from performing full-duplex operations (e.g., may refrain from operating in a full-duplex mode) during the full-duplex time interval (e.g., based on, in response to, or otherwise associated with the timing of the downlink communication indicating that the downlink communication is to occur during the full-duplex time interval). For example, the first UE 805 and the network node 110 may perform operation(s) as if the full-duplex time interval were a downlink time interval or a flexible time interval. This may reduce or mitigate CLI associated with the downlink communication because the network node 110 may not receive uplink communications during the full-duplex time interval (e.g., because the network node 110 is not performing full-duplex operations during the full-duplex time interval).

In some aspects, the first UE 805 may receive and/or measure the downlink communication during the full-duplex time interval based on, in response to, or otherwise associated with a size of a guard band associated with the downlink communication. For example, the guard band may include frequency domain resources (e.g., resource blocks or resource elements) between first frequency domain resources associated with the downlink communication and second frequency domain resources associated with an uplink subband associated with the full-duplex time interval. For example, the full-duplex time interval may be an SBFD time interval. The first UE 805 may receive and/or measure the downlink communication during the full-duplex time interval based on, in response to, or otherwise associated with the size of a guard band (e.g., a number of the frequency domain resources included in the guard band) satisfying the guard band threshold. For example, if the first UE 805 is scheduled or configured to receive and/or measure the downlink communication during the full-duplex time interval, then the first UE 805 may receive and/or measure the downlink communication based on, in response to, or otherwise associated with the guard band being configured or scheduled with a sufficient guard band such that CLI (e.g., inter-UE CLI) does not impact the reception performance and/or measurements of the downlink communication. If the size of the guard band does not satisfy the guard band threshold, then the UE 120 and/or the network node 110 may drop (e.g., the UE 120 may refrain from receiving and the network node 110 may refrain from transmitting) the downlink communication.

As shown by reference number 855, the first UE 805 may measure the downlink communication (e.g., a downlink reference signal) to obtain one or more measurement values. For example, the one or more measurement values may be RSRP values, RSSI values, SINR values, BLER values, and/or CQI values, among other examples. As shown by reference number 860, the first UE 805 may transmit, and the network node 110 may receive, a report (e.g., a measurement report or a CSI report) indicating the one or more measurement values. Because of the one or more operations described herein, CLI associated with the downlink communication may be mitigated. As a result, an accuracy of the one or more measurement values may be improved. This may improve determinations made by the network node 110 using the one or measurement values, such as scheduling determinations and/or determinations of one or more communication parameters to be used by the first UE 805. The improved determinations may improve performance and/or efficiency of the wireless network and/or of communications between the first UE 805 and the network node 110.

In some aspects, the first UE 805 may determine that the one or more measurement values are impacted by CLI (e.g., by inter-UE CLI). For example, the first UE 805 may measure a bandwidth, bandwidth part, or component carrier configured for the first UE 805. The bandwidth, bandwidth part, or component carrier may include a first set of frequency domain resources associated with uplink (e.g., one or more uplink subbands) and a second set of frequency domain resources associated with downlink (e.g., one or more downlink subbands), such as an SBFD slot depicted and described in connection with FIG. 7. The first UE 805 may measure a first signal strength associated with the one or more uplink subbands and a second signal strength associated with the one or more downlink subbands (e.g., in which the downlink communication is measured or received). The first UE 805 may determine whether the one or more measurement values are impacted by CLI based on comparing the first signal strength to the second signal strength. For example, if the first signal strength associated with the one or more uplink subbands is greater than the second signal strength associated with the one or more downlink subbands, then the first UE 805 may determine that the one or more measurement values are impacted by CLI. As another example, if a difference between the first signal strength and the second signal strength satisfies a CLI threshold, then the first UE 805 may determine that the one or more measurement values are impacted by CLI.

In some aspects, the first UE 805 may determine that the one or more measurement values are impacted by inter-UE CLI based on, or in response to, a signal strength measurement of the one or more measurement values remaining high while an SINR value of the one or more measurement values remains low. For example, the first UE 805 may determine that the one or more measurement values are impacted by inter-UE CLI based on, or in response to, the signal strength measurement value satisfying a signal strength threshold and the SINR value not satisfying an SINR threshold (e.g., for a given period of time). For example, a high signal strength value may indicate that the first UE 805 is receiving a signal with high power and a low SINR value may indicate a high level of interference, thereby indicating that the high power is caused by a transmission from another UE (e.g., the second UE 810) causing inter-UE CLI.

The first UE 805 may perform one or more actions associated with the one or more measurement values based on, in response to, or otherwise associated with determining that the one or more measurement values are impacted by CLI (e.g., by inter-UE CLI). For example, the first UE 805 may refrain from including the one or more measurement values in a measurement report or from applying the one or more measurement values to a calculation of a filtered measurement value based at least in part on the one or more measurement values indicating that the measurement of the downlink communication is impacted by cross-link interference. For example, a filtered measurement value may be a measurement value that is filtered (e.g., by applying a filter coefficient for one or more previous measurement values and a current measurement value) to remove noise or interference. For example, the first UE 805 may skip a measurement occasion associated with the downlink communication and/or may not apply the value of measurement(s) to a filtered value.

As another example, the first UE 805 may transmit, and the network node 110 may receive, a report indicating that the downlink communication is associated with CLI based on, in response to, or otherwise associated with the one or more measurement values indicating that the measurement of the downlink communication is impacted by CLI. For example, the first UE 805 may transmit, and the network node 110 may receive, a report indicating that signal strength measurements (e.g., RSSI and/or RSRP measurements) are high while SINR measurements are low, thereby indicating an excessive amount of CLI.

As another example, the first UE 805 may transmit, and the network node 110 may receive, a measurement report indicating that the downlink communication is impacted by CLI based on, in response to, or otherwise associated with the one or more measurement values indicating that the measurement of the downlink communication is impacted by CLI. For example, the first UE 805 may use one or more values in the measurement report to indicate the one or more measurement values. For example, the one or more values may be associated with indicating that the one or more measurement values are impacted by CLI. As an example, a measurement report may be configured such that the first UE 805 can indicate a value from 0 to 23 for indicating a measurement value. Values 0 to 22 may be associated with indicating actual measurement values, whereas the value of 23 may be associated with indicating that the measurement value(s) are impacted by CLI (for example, and should be ignored or disregarded by the network node 110). For example, the first UE 805 may transmit, and the network node 110 may receive, the measurement report indicating the value of 23. As a result, the network node 110 may identify that the downlink measurement(s) performed by the first UE 805 were impacted by CLI.

The network node 110 may perform one or more actions (e.g., to mitigate inter-UE CLI experienced by the first UE 805) in response to identifying that the downlink measurement(s) performed by the first UE 805 were impacted by CLI. For example, the network node 110 may adjust scheduling for the first UE 805 and/or one or more other UEs, such as the second UE 810. As another example, the network node 110 may adjust a transmit power backoff being used by the one or more other UEs, such as the second UE 810.

As a result, CLI associated with the downlink communication may be mitigated. For example, because the first UE 805 receives an indication of time intervals in which the network node 110 is to perform full-duplex operations (e.g., the first UE 805 may receive an indication of one or more full-duplex time intervals), the first UE 805 is enabled to identify time intervals during which the certain measurements and/or PDCCH monitoring should occur to avoid or mitigate CLI caused by transmissions from other UEs (e.g., that may occur during full-duplex time intervals). This improves an accuracy of measurements performed by the first UE 805 using the downlink communication and/or improves a communication performance of the downlink communication. For example, a likelihood that an RF component of the first UE 805 becomes saturated and/or that a dynamic range of an RF component of the first UE 805 is set incorrectly may be reduced, thereby improving the performance of the first UE 805 when receiving and/or measuring the downlink communication.

As indicated above, FIG. 8 is provided as an example. Other examples may differ from what is described with regard to FIG. 8.

Figure 9:
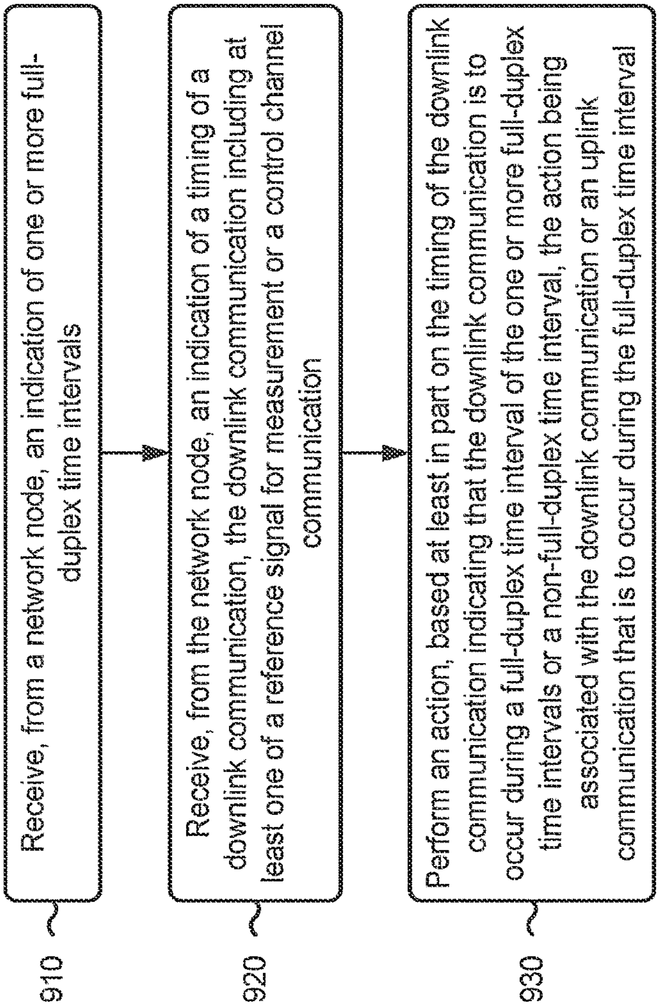
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120, the first UE 805, and/or the second UE 810) performs operations associated with mitigating cross-link interference for downlink communications.

As shown in FIG. 9, in some aspects, process 900 may include receiving, from a network node, an indication of one or more full-duplex time intervals (block 910). For example, the UE (e.g., using reception component 1102 and/or communication manager 1106, depicted in FIG. 11) may receive, from a network node, an indication of one or more full-duplex time intervals, as described above.

As further shown in FIG. 9, in some aspects, process 900 may include receiving, from the network node, an indication of a timing of a downlink communication, the downlink communication including at least one of a reference signal for measurement or a control channel communication (block 920). For example, the UE (e.g., using reception component 1102 and/or communication manager 1106, depicted in FIG. 11) may receive, from the network node, an indication of a timing of a downlink communication, the downlink communication including at least one of a reference signal for measurement or a control channel communication, as described above.

As further shown in FIG. 9, in some aspects, process 900 may include performing an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval (block 930). For example, the UE (e.g., using communication manager 1106, depicted in FIG. 11) may perform an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval, as described above. In other words, the action performed by the UE may be based at least in part on, or in response to, whether the timing of the downlink communication indicates that the downlink communication is to occur during the full-duplex time interval or during a non-full-duplex time interval.

Process 900 may include additional aspects, such as any single aspect or any combination of aspects described below and/or in connection with one or more other processes described elsewhere herein.

In a first aspect, performing the action includes receiving the downlink communication based on the timing of the downlink communication indicating that the downlink communication is to occur during the non-full-duplex time interval.

In a second aspect, alone or in combination with the first aspect, the non-full-duplex time interval is a downlink time interval or a flexible time interval.

In a third aspect, alone or in combination with one or more of the first and second aspects, performing the action includes receiving, during the full-duplex time interval, the downlink communication based at least in part on identifying that the network node is not associated with full-duplex operation during the full-duplex time interval.

In a fourth aspect, alone or in combination with one or more of the first through third aspects, performing the action includes dropping the uplink communication based at least in part on the timing of the downlink communication indicating that the downlink communication is to occur during the full-duplex time interval.

In a fifth aspect, alone or in combination with one or more of the first through fourth aspects, performing the action includes receiving, during the full-duplex time interval, the downlink communication based at least in part on a size of a guard band associated with the downlink communication satisfying a guard band threshold.

In a sixth aspect, alone or in combination with one or more of the first through fifth aspects, the guard band includes frequency domain resources between first frequency domain resources associated with the downlink communication and second frequency domain resources associated with an uplink subband associated with the full-duplex time interval.

In a seventh aspect, alone or in combination with one or more of the first through sixth aspects, the timing of the downlink communication indicates that the downlink communication is to occur during the full-duplex time interval, and performing the action includes transmitting, during the full-duplex time interval, the uplink communication using a transmit power that is modified by a transmit power backoff.

In an eighth aspect, alone or in combination with one or more of the first through seventh aspects, process 900 includes receiving, from the network node, an indication of the transmit power backoff.

In a ninth aspect, alone or in combination with one or more of the first through eighth aspects, a value of the transmit power backoff is associated with a level of cross-link interference between the UE and another UE that is associated with the downlink communication.

In a tenth aspect, alone or in combination with one or more of the first through ninth aspects, process 900 includes measuring the downlink communication to obtain one or more measurement values, and the action is associated with whether the one or more measurement values indicate that the measurement of the downlink communication is impacted by cross-link interference.

In an eleventh aspect, alone or in combination with one or more of the first through tenth aspects, performing the action includes refraining from including the one or more measurement values in a measurement report or from applying the one or more measurement values to a calculation of a filtered measurement value based at least in part on the one or more measurement values indicating that the measurement of the downlink communication is impacted by cross-link interference.

In a twelfth aspect, alone or in combination with one or more of the first through eleventh aspects, performing the action includes transmitting a report indicating that the downlink communication is associated with cross-link interference in response to the one or more measurement values indicating that the measurement of the downlink communication is impacted by cross-link interference.

In a thirteenth aspect, alone or in combination with one or more of the first through twelfth aspects, the one or more measurement values include a signal strength measurement value and an SINR value, and the one or more measurement values indicate that the measurement of the downlink communication is impacted by cross-link interference based at least in part on the signal strength measurement value satisfying a signal strength threshold and the SINR value not satisfying an SINR threshold.

In a fourteenth aspect, alone or in combination with one or more of the first through thirteenth aspects, performing the action includes transmitting a measurement report indicating that the downlink communication is impacted by cross-link interference in response to the one or more measurement values indicating that the measurement of the downlink communication is impacted by cross-link interference.

In a fifteenth aspect, alone or in combination with one or more of the first through fourteenth aspects, the measurement report includes one or more values to indicate the one or more measurement values, and the one or more values are associated with indicating that the one or more measurement values are impacted by cross-link interference.

In a sixteenth aspect, alone or in combination with one or more of the first through fifteenth aspects, the reference signal for measurement includes at least one of a radio resource management reference signal, a radio link management reference signal, a tracking reference signal, an automatic gain control reference signal, a beam failure detection reference signal, a beam management reference signal, a synchronization signal block signal, or a channel state information reference signal.

In a seventeenth aspect, alone or in combination with one or more of the first through sixteenth aspects, the control channel communication includes at least one of a common control channel communication, a group common control channel, or a communication associated with a common search space.

In an eighteenth aspect, alone or in combination with one or more of the first through seventeenth aspects, the one or more full-duplex time intervals include one or more sub-band full-duplex time intervals.

In a nineteenth aspect, alone or in combination with one or more of the first through eighteenth aspects, the one or more full-duplex time intervals include one or more full-duplex slots or one or more full-duplex symbols.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
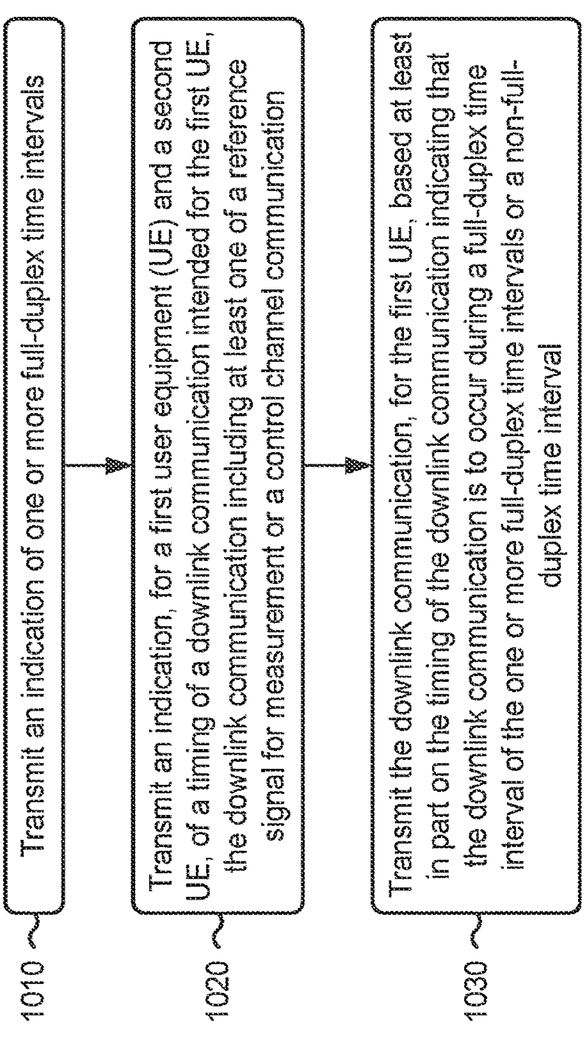
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with mitigating cross-link interference for downlink communications.

As shown in FIG. 10, in some aspects, process 1000 may include transmitting an indication of one or more full-duplex time intervals (block 1010). For example, the network node (e.g., using transmission component 1204 and/or communication manager 1206, depicted in FIG. 12) may transmit an indication of one or more full-duplex time intervals, as described above.

As further shown in FIG. 10, in some aspects, process 1000 may include transmitting an indication, for a first UE and a second UE, of a timing of a downlink communication intended for the first UE, the downlink communication including at least one of a reference signal for measurement or a control channel communication (block 1020). For example, the network node (e.g., using transmission component 1204 and/or communication manager 1206, depicted in FIG. 12) may transmit an indication, for a first UE and a second UE, of a timing of a downlink communication intended for the first UE, the downlink communication including at least one of a reference signal for measurement or a control channel communication, as described above.

As further shown in FIG. 10, in some aspects, process 1000 may include transmitting the downlink communication, for the first UE, based at least in part on the timing of the downlink communication indicating that the downlink communication is to occur during a full-duplex time interval of the one or more full-duplex time intervals or a non-full-duplex time interval (block 1030). For example, the network node (e.g., using transmission component 1204 and/or communication manager 1206, depicted in FIG. 12) may transmit the downlink communication, for the first UE, based at least in part on the timing of the downlink communication indicating that the downlink communication is to occur during a full-duplex time interval of the one or more full-duplex time intervals or a non-full-duplex time interval, as described above.

Process 1000 may include additional aspects, such as any single aspect or any combination of aspects described below and/or in connection with one or more other processes described elsewhere herein.

In a first aspect, transmitting the downlink communication includes transmitting the downlink communication based at least in part on the timing of the downlink communication indicating that the downlink communication is to occur during the non-full-duplex time interval.

In a second aspect, alone or in combination with the first aspect, the non-full-duplex time interval is a downlink time interval or a flexible time interval.

In a third aspect, alone or in combination with one or more of the first and second aspects, transmitting the downlink communication includes transmitting, during the full-duplex time interval, the downlink communication, and operating, during the full-duplex time interval, in a half-duplex mode in response to transmitting the downlink communication during the full-duplex time interval.

In a fourth aspect, alone or in combination with one or more of the first through third aspects, process 1000 includes dropping, during the full-duplex time interval, an uplink communication, associated with the second UE, based at least in part on the timing of the downlink communication indicating that the downlink communication is to occur during the full-duplex time interval.

In a fifth aspect, alone or in combination with one or more of the first through fourth aspects, transmitting the downlink communication includes transmitting, during the full-duplex time interval, the downlink communication based at least in part on a size of a guard band associated with the downlink communication satisfying a guard band threshold.

In a sixth aspect, alone or in combination with one or more of the first through fifth aspects, the guard band includes frequency domain resources between first frequency domain resources associated with the downlink communication and second frequency domain resources associated with an uplink subband associated with the full-duplex time interval.

In a seventh aspect, alone or in combination with one or more of the first through sixth aspects, the timing of the downlink communication indicates that the downlink communication is to occur during the full-duplex time interval, and process 1000 includes receiving, during the full-duplex time interval, an uplink communication associated with the second UE, the uplink communication being associated with a transmit power that is modified by a transmit power backoff.

In an eighth aspect, alone or in combination with one or more of the first through seventh aspects, process 1000 includes transmitting an indication, for the second UE, of the transmit power backoff.

In a ninth aspect, alone or in combination with one or more of the first through eighth aspects, a value of the transmit power backoff is associated with a level of cross-link interference between the first UE and the second UE.

In a tenth aspect, alone or in combination with one or more of the first through ninth aspects, process 1000 includes receiving a cross-link interference measurement report, associated with the first UE, indicating a cross-link interference value associated with the first UE and the second UE, where a value of the transmit power backoff is associated with the value of cross-link interference associated with the first UE and the second UE.

In an eleventh aspect, alone or in combination with one or more of the first through tenth aspects, process 1000 includes receiving a report, associated with the first UE, indicating that the downlink communication is associated with cross-link interference based at least in part on one or more measurement values indicating that the measurement of the downlink communication is impacted by cross-link interference.

In a twelfth aspect, alone or in combination with one or more of the first through eleventh aspects, the one or more measurement values include a signal strength measurement value and an SINR value, and the one or more measurement values indicate that the measurement of the downlink communication is impacted by cross-link interference based at least in part on the signal strength measurement value satisfying a signal strength threshold and the SINR value not satisfying an SINR threshold.

In a thirteenth aspect, alone or in combination with one or more of the first through twelfth aspects, process 1000 includes receiving a measurement report, associated with the first UE, indicating that the downlink communication is impacted by cross-link interference.

In a fourteenth aspect, alone or in combination with one or more of the first through thirteenth aspects, the measurement report includes one or more values to indicate one or more measurement values of the downlink communication, and the one or more values are associated with indicating that the one or more measurement values are impacted by cross-link interference.

In a fifteenth aspect, alone or in combination with one or more of the first through fourteenth aspects, the reference signal for measurement includes at least one of a radio resource management reference signal, a radio link management reference signal, a tracking reference signal, an automatic gain control reference signal, a beam failure detection reference signal, a beam management reference signal, a synchronization signal block signal, or a channel state information reference signal.

In a sixteenth aspect, alone or in combination with one or more of the first through fifteenth aspects, the control channel communication includes at least one of a common control channel communication, a group common control channel, or a communication associated with a common search space.

In a seventeenth aspect, alone or in combination with one or more of the first through sixteenth aspects, the one or more full-duplex time intervals include one or more subband full-duplex time intervals.

In an eighteenth aspect, alone or in combination with one or more of the first through seventeenth aspects, the one or more full-duplex time intervals include one or more full-duplex slots or one or more full-duplex symbols.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
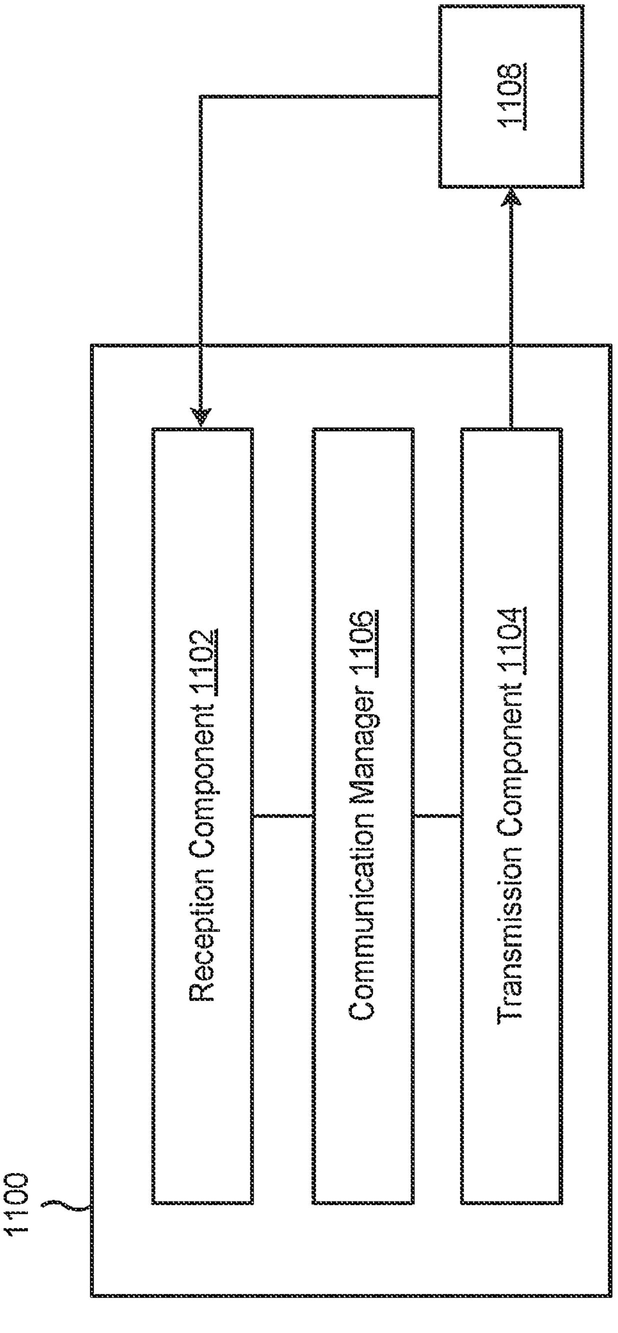
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a network node, an indication of one or more full-duplex time intervals. The reception component 1102 may receive, from the network node, an indication of a timing of a downlink communication, the downlink communication including at least one of a reference signal for measurement or a control channel communication. The communication manager 1106 may perform an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval.

The reception component 1102 may receive, from the network node, an indication of a transmit power backoff.

The communication manager 1106 may measure the downlink communication to obtain one or more measurement values.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
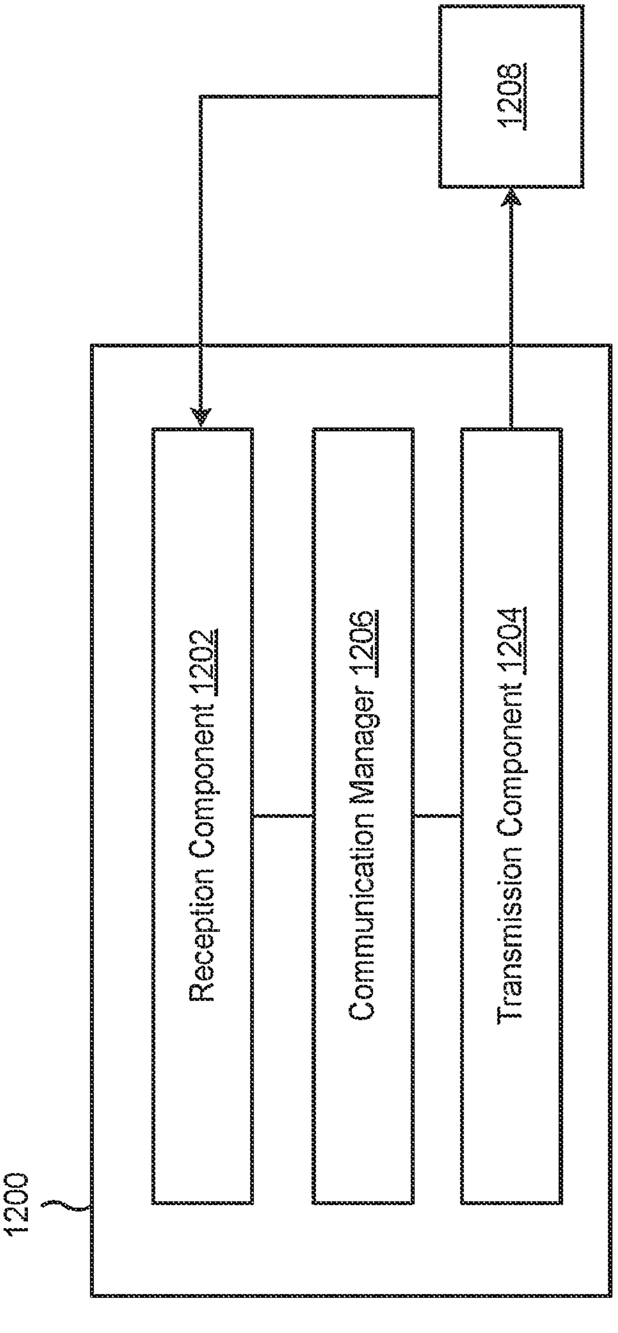
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit an indication of one or more full-duplex time intervals. The transmission component 1204 may transmit an indication, for a first UE and a second UE, of a timing of a downlink communication intended for the first UE, the downlink communication including at least one of a reference signal for measurement or a control channel communication. The transmission component 1204 may transmit the downlink communication, for the first UE, based at least in part on the timing of the downlink communication indicating that the downlink communication is to occur during a full-duplex time interval of the one or more full-duplex time intervals or a non-full-duplex time interval.

The communication manager 1206 may drop, during the full-duplex time interval, an uplink communication, associated with the second UE, based at least in part on the timing of the downlink communication indicating that the downlink communication is to occur during the full-duplex time interval.

The transmission component 1204 may transmit an indication, for the second UE, of a transmit power backoff.

The reception component 1202 may receive a cross-link interference measurement report, associated with the first UE, indicating a cross-link interference value associated with the first UE and the second UE, wherein a value of the transmit power backoff is associated with the value of cross-link interference associated with the first UE and the second UE.

The reception component 1202 may receive a report, associated with the first UE, indicating that the downlink communication is associated with cross-link interference based at least in part on one or more measurement values indicating that the measurement of the downlink communication is impacted by cross-link interference.

The reception component 1202 may receive a measurement report, associated with the first UE, indicating that the downlink communication is impacted by cross-link interference.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a network node, an indication of one or more full-duplex time intervals; receiving, from the network node, an indication of a timing of a downlink communication, the downlink communication including at least one of a reference signal for measurement or a control channel communication; and performing an action, based at least in part on the timing of the downlink communication indicating that the downlink communication is to occur during a full-duplex time interval of the one or more full-duplex time intervals or a non-full-duplex time interval, the action being associated with the downlink communication or an uplink communication that is to occur during the full-duplex time interval.

Aspect 2: The method of Aspect 1, wherein performing the action comprises: receiving the downlink communication based on the timing of the downlink communication indicating that the downlink communication is to occur during the non-full-duplex time interval.

Aspect 3: The method of Aspect 2, wherein the non-full-duplex time interval is a downlink time interval or a flexible time interval.

Aspect 4: The method of any of Aspects 1-3, wherein performing the action comprises: receiving, during the full-duplex time interval, the downlink communication based at least in part on identifying that the network node is not associated with full-duplex operation during the full-duplex time interval.

Aspect 5: The method of Aspect 1, wherein performing the action comprises: dropping the uplink communication based at least in part on the timing of the downlink communication indicating that the downlink communication is to occur during the full-duplex time interval.

Aspect 6: The method of any of Aspects 1-4, wherein performing the action comprises: receiving, during the full-duplex time interval, the downlink communication based at least in part on a size of a guard band associated with the downlink communication satisfying a guard band threshold.

Aspect 7: The method of Aspect 6, wherein the guard band includes frequency domain resources between first frequency domain resources associated with the downlink communication and second frequency domain resources associated with an uplink subband associated with the full-duplex time interval.

Aspect 8: The method of Aspect 1, wherein the timing of the downlink communication indicates that the downlink communication is to occur during the full-duplex time interval, and wherein performing the action comprises: transmitting, during the full-duplex time interval, the uplink communication using a transmit power that is modified by a transmit power backoff.

Aspect 9: The method of Aspect 8, further comprising: receiving, from the network node, an indication of the transmit power backoff.

Aspect 10: The method of any of Aspects 8-10, wherein a value of the transmit power backoff is associated with a level of cross-link interference between the UE and another UE that is associated with the downlink communication.

Aspect 11: The method of any of Aspects 1-4, and 6-7, further comprising: measuring the downlink communication to obtain one or more measurement values, and wherein the action is associated with whether the one or more measurement values indicate that the measurement of the downlink communication is impacted by cross-link interference. wherein the action is associated with whether the one or more measurement values indicate that the measurement of the downlink communication is impacted by cross-link interference.

Aspect 12: The method of Aspect 11, wherein performing the action comprises: refraining from including the one or more measurement values in a measurement report or from applying the one or more measurement values to a calculation of a filtered measurement value based at least in part on the one or more measurement values indicating that the measurement of the downlink communication is impacted by cross-link interference.

Aspect 13: The method of any of Aspects 11-12, wherein performing the action comprises: transmitting a report indicating that the downlink communication is associated with cross-link interference in response to the one or more measurement values indicating that the measurement of the downlink communication is impacted by cross-link interference.

Aspect 14: The method of any of Aspects 11-13, wherein the one or more measurement values include a signal strength measurement value and a signal-to-interference-plus-noise ratio (SINR) value, and wherein the one or more measurement values indicate that the measurement of the downlink communication is impacted by cross-link interference based at least in part on the signal strength measurement value satisfying a signal strength threshold and the SINR value not satisfying an SINR threshold.

Aspect 15: The method of any of Aspects 11-14, wherein performing the action comprises: transmitting a measurement report indicating that the downlink communication is impacted by cross-link interference in response to the one or more measurement values indicating that the measurement of the downlink communication is impacted by cross-link interference.

Aspect 16: The method of Aspect 15, wherein the measurement report includes one or more values to indicate the one or more measurement values, and wherein the one or more values are associated with indicating that the one or more measurement values are impacted by cross-link interference.

Aspect 17: The method of any of Aspects 1-16, wherein the reference signal for measurement includes at least one of: a radio resource management reference signal, a radio link management reference signal, a tracking reference signal, an automatic gain control reference signal, a beam failure detection reference signal, a beam management reference signal, a synchronization signal block signal, or a channel state information reference signal.

Aspect 18: The method of any of Aspects 1-17, wherein the control channel communication includes at least one of: a common control channel communication, a group common control channel, or a communication associated with a common search space.

Aspect 19: The method of any of Aspects 1-18, wherein the one or more full-duplex time intervals comprise one or more sub-band full-duplex time intervals.

Aspect 20: The method of any of Aspects 1-19, wherein the one or more full-duplex time intervals comprise one or more full-duplex slots or one or more full-duplex symbols.

Aspect 21: A method of wireless communication performed by a network node, comprising: transmitting an indication of one or more full-duplex time intervals; transmitting an indication, for a first user equipment (UE) and a second UE, of a timing of a downlink communication intended for the first UE, the downlink communication including at least one of a reference signal for measurement or a control channel communication; and transmitting the downlink communication, for the first UE, based at least in part on the timing of the downlink communication indicating that the downlink communication is to occur during a full-duplex time interval of the one or more full-duplex time intervals or a non-full-duplex time interval.

Aspect 22: The method of Aspect 21, wherein transmitting the downlink communication comprises: transmitting the downlink communication based at least in part on the timing of the downlink communication indicating that the downlink communication is to occur during the non-full-duplex time interval.

Aspect 23: The method of Aspect 22, wherein the non-full-duplex time interval is a downlink time interval or a flexible time interval.

Aspect 24: The method of any of Aspects 21-23, wherein transmitting the downlink communication comprises: transmitting, during the full-duplex time interval, the downlink communication; and operating, during the full-duplex time interval, in a half-duplex mode in response to transmitting the downlink communication during the full-duplex time interval.

Aspect 25: The method of any of Aspects 21-24, further comprising: dropping, during the full-duplex time interval, an uplink communication, associated with the second UE, based at least in part on the timing of the downlink communication indicating that the downlink communication is to occur during the full-duplex time interval.

Aspect 26: The method of any of Aspects 21-25, wherein transmitting the downlink communication comprises: transmitting, during the full-duplex time interval, the downlink communication based at least in part on a size of a guard band associated with the downlink communication satisfying a guard band threshold.

Aspect 27: The method of Aspect 26, wherein the guard band includes frequency domain resources between first frequency domain resources associated with the downlink communication and second frequency domain resources associated with an uplink subband associated with the full-duplex time interval.

Aspect 28: The method of any of Aspects 21-27, wherein the timing of the downlink communication indicates that the downlink communication is to occur during the full-duplex time interval, and the method further comprising: receiving, during the full-duplex time interval, an uplink communication associated with the second UE, the uplink communication being associated with a transmit power that is modified by a transmit power backoff.

Aspect 29: The method of Aspect 28, further comprising: transmitting an indication, for the second UE, of the transmit power backoff.

Aspect 30: The method of any of Aspects 28-29, wherein a value of the transmit power backoff is associated with a level of cross-link interference between the first UE and the second UE.

Aspect 31: The method of any of Aspects 28-30, further comprising: receiving a cross-link interference measurement report, associated with the first UE, indicating a cross-link interference value associated with the first UE and the second UE, wherein a value of the transmit power backoff is associated with the value of cross-link interference associated with the first UE and the second UE.

Aspect 32: The method of any of Aspects 21-31, further comprising: receiving a report, associated with the first UE, indicating that the downlink communication is associated with cross-link interference based at least in part on one or more measurement values indicating that the measurement of the downlink communication is impacted by cross-link interference.

Aspect 33: The method of Aspect 32, wherein the one or more measurement values include a signal strength measurement value and a signal-to-interference-plus-noise ratio (SINR) value, and wherein the one or more measurement values indicate that the measurement of the downlink communication is impacted by cross-link interference based at least in part on the signal strength measurement value satisfying a signal strength threshold and the SINR value not satisfying an SINR threshold.

Aspect 34: The method of any of Aspects 21-33, further comprising: receiving a measurement report, associated with the first UE, indicating that the downlink communication is impacted by cross-link interference.

Aspect 35: The method of Aspect 34, wherein the measurement report includes one or more values to indicate one or more measurement values of the downlink communication, and wherein the one or more values are associated with indicating that the one or more measurement values are impacted by cross-link interference.

Aspect 36: The method of any of Aspects 21-35, wherein the reference signal for measurement includes at least one of: a radio resource management reference signal, a radio link management reference signal, a tracking reference signal, an automatic gain control reference signal, a beam failure detection reference signal, a beam management reference signal, a synchronization signal block signal, or a channel state information reference signal.

Aspect 37: The method of any of Aspects 21-36, wherein the control channel communication includes at least one of: a common control channel communication, a group common control channel, or a communication associated with a common search space.

Aspect 38: The method of any of Aspects 21-37, wherein the one or more full-duplex time intervals comprise one or more sub-band full-duplex time intervals.

Aspect 39: The method of any of Aspects 21-38, wherein the one or more full-duplex time intervals comprise one or more full-duplex slots or one or more full-duplex symbols.

Aspect 40: An apparatus for wireless communication at a device, comprising a processor; memory coupled with the processor; and instructions stored in the memory and executable by the processor to cause the apparatus to perform the method of one or more of Aspects 1-20.

Aspect 41: A device for wireless communication, comprising a memory and one or more processors coupled to the memory, the one or more processors configured to perform the method of one or more of Aspects 1-20.

Aspect 42: An apparatus for wireless communication, comprising at least one means for performing the method of one or more of Aspects 1-20.

Aspect 43: A non-transitory computer-readable medium storing code for wireless communication, the code comprising instructions executable by a processor to perform the method of one or more of Aspects 1-20.

Aspect 44: A non-transitory computer-readable medium storing a set of instructions for wireless communication, the set of instructions comprising one or more instructions that, when executed by one or more processors of a device, cause the device to perform the method of one or more of Aspects 1-20.

Aspect 45: An apparatus for wireless communication at a device, comprising a processor; memory coupled with the processor; and instructions stored in the memory and executable by the processor to cause the apparatus to perform the method of one or more of Aspects 21-39.

Aspect 46: A device for wireless communication, comprising a memory and one or more processors coupled to the memory, the one or more processors configured to perform the method of one or more of Aspects 21-39.

Aspect 47: An apparatus for wireless communication, comprising at least one means for performing the method of one or more of Aspects 21-39.

Aspect 48: A non-transitory computer-readable medium storing code for wireless communication, the code comprising instructions executable by a processor to perform the method of one or more of Aspects 21-39.

Aspect 49: A non-transitory computer-readable medium storing a set of instructions for wireless communication, the set of instructions comprising one or more instructions that, when executed by one or more processors of a device, cause the device to perform the method of one or more of Aspects 21-39.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. Also, "determining" can include resolving, selecting, obtaining, choosing, establishing and other such similar actions.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:

receiving, from a network node, an indication of one or more full-duplex time intervals;

receiving, from the network node, an indication of a timing of a downlink communication, the downlink communication including at least one of a synchronization signal block (SSB) for measurement or a control channel communication, wherein the timing of the downlink communication indicates that the downlink communication is to overlap with a timing of an uplink communication; and performing an action, based at least in part on whether the timing of the downlink communication and the timing of the uplink communication occur during a non-full-duplex time interval or a full-duplex time interval of the one or more full-duplex time intervals, the action being associated with the downlink communication or the uplink communication.

2. The method of claim 1, wherein performing the action comprises:

receiving the downlink communication based on the timing of the downlink communication indicating that the downlink communication is to occur during the non-full-duplex time interval.

3. The method of claim 2, wherein the non-full-duplex time interval is a downlink time interval or a flexible time interval.

4. The method of claim 1, wherein performing the action comprises:

receiving, during the full-duplex time interval, the downlink communication based at least in part on identifying that the network node is not associated with full-duplex operation during the full-duplex time interval.

5. The method of claim 1, wherein performing the action comprises:

dropping the uplink communication based at least in part on the timing of the downlink communication indicating that the downlink communication is to occur during the full-duplex time interval.

6. The method of claim 1, wherein performing the action comprises:

receiving, during the full-duplex time interval, the downlink communication based at least in part on a size of a guard band associated with the downlink communication satisfying a guard band threshold.

7. The method of claim 6, wherein the guard band includes frequency domain resources between first frequency domain resources associated with the downlink communication and second frequency domain resources associated with an uplink subband associated with the full-duplex time interval.

8. The method of claim 1, wherein the timing of the downlink communication indicates that the downlink communication is to occur during the full-duplex time interval, and wherein performing the action comprises:

transmitting, during the full-duplex time interval, the uplink communication using a transmit power that is modified by a transmit power backoff.

9. The method of claim 8, further comprising:

receiving, from the network node, an indication of the transmit power backoff.

10. The method of claim 8, wherein a value of the transmit power backoff is associated with a level of cross-link interference between the UE and another UE that is associated with the downlink communication.

11. A method of wireless communication performed by a network node, comprising:

transmitting an indication of one or more full-duplex time intervals;

transmitting an indication, for a first user equipment (UE) and a second UE, of a timing of a downlink communication intended for the first UE, the downlink communication including at least one of a synchronization signal block (SSB) for measurement or a control channel communication, wherein the timing of the downlink communication indicates that the downlink communication is to overlap with a timing of an uplink communication; and transmitting the downlink communication, for the first UE, based at least in part on whether the timing of the downlink communication and the timing of the uplink communication occur during a non-full-duplex time interval or a full-duplex time interval of the one or more full-duplex time intervals.

12. The method of claim 11, wherein transmitting the downlink communication comprises:

transmitting the downlink communication based at least in part on the timing of the downlink communication indicating that the downlink communication is to occur during the non-full-duplex time interval.

13. The method of claim 11, wherein transmitting the downlink communication comprises:

transmitting, during the full-duplex time interval, the downlink communication; and operating, during the full-duplex time interval, in a half-duplex mode in response to transmitting the downlink communication during the full-duplex time interval.

14. The method of claim 11, further comprising:
dropping, during the full-duplex time interval, an uplink communication, associated with the second UE, based at least in part on the timing of the downlink communication indicating that the downlink communication is to occur during the full-duplex time interval.

15. The method of claim 11,
wherein transmitting the downlink communication comprises:
transmitting, during the full-duplex time interval, the downlink communication based at least in part on a size of a guard band associated with the downlink communication satisfying a guard band threshold.

16. A user equipment (UE) for wireless communication, comprising:
one or more memories; and
one or more processors, coupled to the one or more memories, configured to:
receive, from a network node, an indication of one or more full-duplex time intervals;
receive, from the network node, an indication of a timing of a downlink communication, the downlink communication including at least one of a synchronization signal block (SSB) for measurement or a control channel communication, wherein the timing of the downlink communication indicates that the downlink communication is to overlap with a timing of an uplink communication; and
perform an action, based at least in part on whether the timing of the downlink communication and the timing of the uplink communication occur during a non-full-duplex time interval or a full-duplex time interval of the one or more full-duplex time intervals, the action being associated with the downlink communication or the uplink communication.

17. The UE of claim 16,
wherein the one or more processors, to perform the action, are configured to:
receive the downlink communication based on the timing of the downlink communication indicating that the downlink communication is to occur during the non-full-duplex time interval.

18. The UE of claim 16,
wherein the one or more processors, to perform the action, are configured to:
receive, during the full-duplex time interval, the downlink communication based at least in part on identifying that the network node is not associated with full-duplex operation during the full-duplex time interval.

19. The UE of claim 16,
wherein the one or more processors, to perform the action, are configured to:
drop the uplink communication based at least in part on the timing of the downlink communication indicating that the downlink communication is to occur during the full-duplex time interval.

20. The UE of claim 16,
wherein the one or more processors are further configured to:
measure the downlink communication to obtain one or more measurement values, and
wherein the action is associated with whether the one or more measurement values indicate that the measurement of the downlink communication is impacted by cross-link interference.

21. The UE of claim 20,
wherein the one or more processors, to perform the action, are configured to:
refrain from including the one or more measurement values in a measurement report or from applying the one or more measurement values to a calculation of a filtered measurement value based at least in part on the one or more measurement values indicating that the measurement of the downlink communication is impacted by cross-link interference.

22. The UE of claim 20,
wherein the one or more processors, to perform the action, are configured to:
transmit a report indicating that the downlink communication is associated with cross-link interference in response to the one or more measurement values indicating that the measurement of the downlink communication is impacted by cross-link interference.

23. The UE of claim 20,
wherein the one or more measurement values include a signal strength measurement value and a signal-to-interference-plus-noise ratio (SINR) value, and
wherein the one or more measurement values indicate that the measurement of the downlink communication is impacted by cross-link interference based at least in part on the signal strength measurement value satisfying a signal strength threshold and the SINR value not satisfying an SINR threshold.

24. The UE of claim 20,
wherein the one or more processors, to perform the action, are configured to:
transmit a measurement report indicating that the downlink communication is impacted by cross-link interference in response to the one or more measurement values indicating that the measurement of the downlink communication is impacted by cross-link interference.

25. The UE of claim 24,
wherein the measurement report includes one or more values to indicate the one or more measurement values, and wherein the one or more values are associated with indicating that the one or more measurement values are impacted by cross-link interference.

26. A network node for wireless communication, comprising:
one or more memories; and
one or more processors, coupled to the one or more memories, configured to:
transmit an indication of one or more full-duplex time intervals;
transmit an indication, for a first user equipment (UE) and a second UE, of a timing of a downlink communication intended for the first UE, the downlink communication including at least one of a synchronization signal block (SSB) for measurement or a control channel communication, wherein the timing of the downlink communication indicates that the downlink communication is to overlap with a timing of an uplink communication; and
transmit the downlink communication, for the first UE, based at least in part on whether the timing of the downlink communication and the timing of the uplink communication occur during a non-full-duplex time interval or a full-duplex time interval of the one or more full-duplex time intervals.

27. The network node of claim 26, wherein the one or more processors, to transmit the downlink communication, are configured to:

transmit, during the full-duplex time interval, the downlink communication based at least in part on a size of a guard band associated with the downlink communication satisfying a guard band threshold.

28. The network node of claim 26, wherein the timing of the downlink communication indicates that the downlink communication is to occur during the full-duplex time interval, and wherein the one or more processors are further configured to:

receive, during the full-duplex time interval, an uplink communication associated with the second UE, the uplink communication being associated with a transmit power that is modified by a transmit power backoff.

29. The network node of claim 28, wherein the one or more processors are further configured to:

transmit an indication, for the second UE, of the transmit power backoff.

30. The network node of claim 28, wherein the one or more processors are further configured to:

receive a cross-link interference measurement report, associated with the first UE, indicating a cross-link interference value associated with the first UE and the second UE, wherein a value of the transmit power backoff is associated with the value of cross-link interference associated with the first UE and the second UE.

* * * * *